United States Patent
Walther et al.

(10) Patent No.: US 12,507,023 B2
(45) Date of Patent: Dec. 23, 2025

(54) METHOD FOR DETERMINING A SOUND FIELD

(71) Applicant: Fraunhofer-Gesellschaft zur Förderung der angewandten Forschung e.V., Munich (DE)

(72) Inventors: Andreas Walther, Erlangen (DE); Albert Prinn, Erlangen (DE); Emanuel Habets, Erlangen (DE); Youssef El Baba, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 308 days.

(21) Appl. No.: 18/318,868

(22) Filed: May 17, 2023

(65) Prior Publication Data
US 2023/0292075 A1    Sep. 14, 2023

Related U.S. Application Data

(63) Continuation of application No. PCT/EP2021/082316, filed on Nov. 19, 2021.

(30) Foreign Application Priority Data

Nov. 20, 2020 (EP) .................................. 20209000

(51) Int. Cl.
*H04S 7/00* (2006.01)
*G01N 29/028* (2006.01)
*G01S 15/06* (2006.01)

(52) U.S. Cl.
CPC ............. *H04S 7/30* (2013.01); *G01N 29/028* (2013.01); *G01S 15/06* (2013.01)

(58) Field of Classification Search
CPC .. H04S 7/30; H04S 7/301; G01H 7/00; G01N 29/028; G01S 15/06; H04R 29/00
See application file for complete search history.

(56) References Cited

U.S. PATENT DOCUMENTS

2005/0157891 A1    7/2005  Johansen
2006/0126858 A1    6/2006  Larsen et al.
(Continued)

FOREIGN PATENT DOCUMENTS

EP    2 997 327 A1    3/2016
WO    2014/183970 A1   11/2014
WO    2020/231884 A1   11/2020

OTHER PUBLICATIONS

Antonello Niccolo et al: "Identification of surface acoustic impedances in a reverberant room using the FDTD method", 2014 14th International Workshop on Acoustic Signal Enhancement (IWAENC), IEEE, Sep. 8, 2014 (Sep. 8, 2014), pp. 114-118 (Year: 2014).*

(Continued)

*Primary Examiner* — Paul Kim
(74) *Attorney, Agent, or Firm* — McClure, Qualey & Rodack, LLP

(57) ABSTRACT

Method for determining a sound field in an enclosed space or at a target position within the enclosed space, the method has the following steps: performing an acoustic measurement at at least one measurement position within the enclosed space or at a single one measurement position within the enclosed space to obtain an interim value set; estimating a surface impedance as first parameter describing the enclosed space based on the interim value set; determining a model of the enclosed space based on the first parameter; and estimating a sound field throughout the enclosed space based on the model of the enclosed space, the (Continued)

sound field describing a sound characteristic for a plurality of positions within the enclosed space.

28 Claims, 11 Drawing Sheets

(56) References Cited

U.S. PATENT DOCUMENTS

| | | |
|---|---|---|
| 2008/0002833 A1 | 1/2008 | Kuster |
| 2011/0268281 A1 | 11/2011 | Florencio et al. |
| 2012/0296600 A1 | 11/2012 | Wijnant |

OTHER PUBLICATIONS

International Search Report and Written Opinion issued in application No. PCT/EP2021/082316.
Karjalainen, M., et al.; "Estimation of modal decay parameters from noisy response measurements;" Journal of the Audio Eng. Soc.; vol. 50; No. 11; 2002; pp. 867-878.
Tuna, C., et al.; "3D Room Geometry Inference Using a Linear Loudspeaker Array and a Single Microphone;" IEEE/ACM Transactions on Audio, Speech, and Language Processing; vol. 28; 2020; pp. 1729-1744.
Karjalainen, M., et al.; "Frequency-zooming ARMA modeling of resonant and reverberant systems;" Journal of the Audio Eng. Soc.; vol. 50; No. 12; Dec. 2002; pp. 1012-1029.
Antonello, N., et al.; "Identification of surface acoustic impedances in a reverberant room using the FDTD method;" 2014 14th International Workshop on Acoustic Signal Enhancement (IWAENC); IEEE; 2014; pp. 114-118.
Walker, R.; "Low-Frequency Room Responses:. \Part 1—Background and Qualitative Considerations;" BBC Research Department Report, British Broadcasting Co.; No. 8; 1992; pp. 1-14.
Moore, A.H., et al.; "Room geometry estimation from a single channel acoustic impulse response;" 21st European Signal Processing Conference EUSIPCO 2013; Sep. 2013; pp. 1-5.
El-Baba, Y.; "Chapter 4 ("Modal room transfer function inference for room compensation") of the PhD-Thesis Room geometry and low-frequency transfer function inference using acoustic transducers;" Der Technischen Fakulat der Friedrich-Alexander-Universitat Erlangen-Nurnberg zur Erlangung des Doktorgrades; Mar. 2022; pp. 1-221.
Dutilleux, G., et al.; "Low-frequency assessment of the in situ acoustic absorption of materials in rooms: an inverse problem approach using evolutionary optimization;" International Journal for Numerical Methods in Engineering, 53(9; 2002; pp. 2143-2161.
Too, G-P.,J., et al.; "Inversion for acoustic impedance of a wall by using artificial neural network;" Applied Acoustics, 68(4):;2007; pp. 77-389.
Nava, G.P., et al.; "On the in situ estimation of surface acoustic impedance in interiors of arbitrary shape by acoustical inverse methods;" Acoustical science and technology, 30(2); 2009; pp. 100-109.
Piechowicz, J., et al.l; "Estimation of acoustic impedance for surfaces delimiting the volume of an enclosed space;" Archives of Acoustics, 37(1); 2012; pp. 97-102.
Antonello, N., et al.; "Evaluation of a numerical method for identifying surface acoustic impedances in a reverberant room;" In Proc. of the 10th European Congress and Exposition on Noise Control Engineering; 2015; pp. 1-6.
Nowakowski, T., et al.; "Membrane shape and boundary conditions estimation using eigenmode decomposition;" Proc. IEEE Intl. Conf. on Acoustics, Speech and Signal Processing (ICASSP); 2016; pp. 3336-3340.
Bertin, N., et al.; "Joint estimation of sound source location and boundary impedance with physics-driven cosparse regularization;" Proc. IEEE Intl. Conf. on Acoustics, Speech and Signal Processing (ICASSP); 2016; pp. 6340-6344.
Henderson, W., et al.; "Bayesian room acoustic modal analysis;" Inter-Noise and Noise-Con Congress and Conference Proceedings, vol. 2012; Jan. 2012; pp. 4038-4045.
Henderson, W., et al.; "Bayesian inference approach to room-acoustic modal analysis;" AIP Conference Proceedings, 1553(1); Aug. 2013; pp. 38-45.
Beaton, D., et al.; "Room acoustic modal analysis using bayesian inference;" J. Acoust. Soc. Am., 141(6); 2017; pp. 4480-4493.
Morse, P.M., et al.; "Sound waves in rooms;" Reviews of modern physics, 16(2); Apr. 1944; pp. 69-150.
Morse, P.M., et al.; "Theoretical acoustics;" McGraw-Hill, Sec. 9.4; 1968; pp. 554-576.
Kuttruff, H.; "Room acoustics;" CRC Press, sixth edition, Chapter 3; 2016; pp. 51-79.
IN Office Action dated Aug. 28, 2024 in Indian application No. 202337036146.

\* cited by examiner

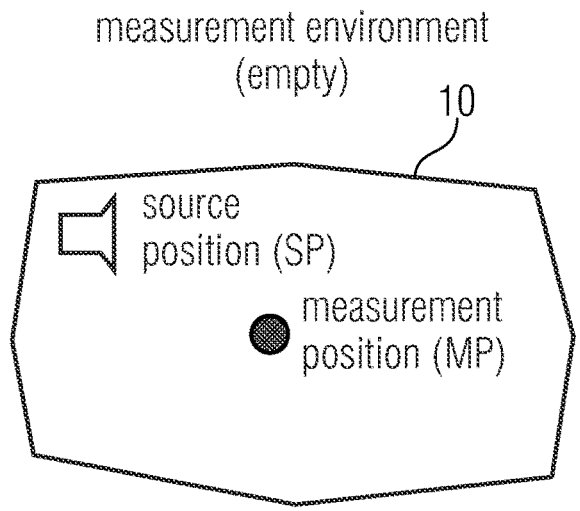
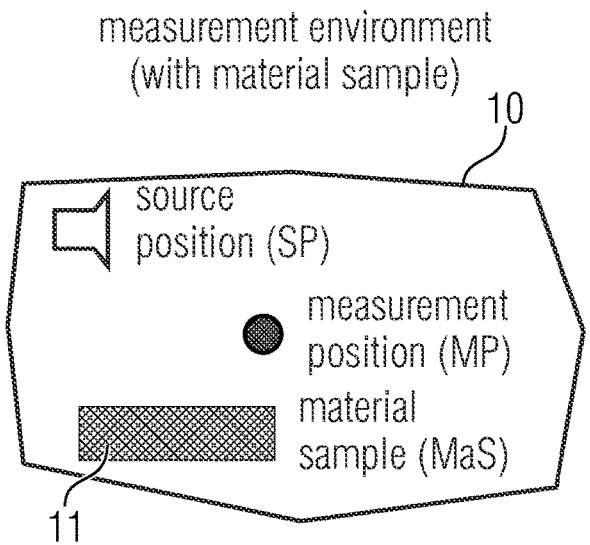
Fig. 4b  Fig. 4c
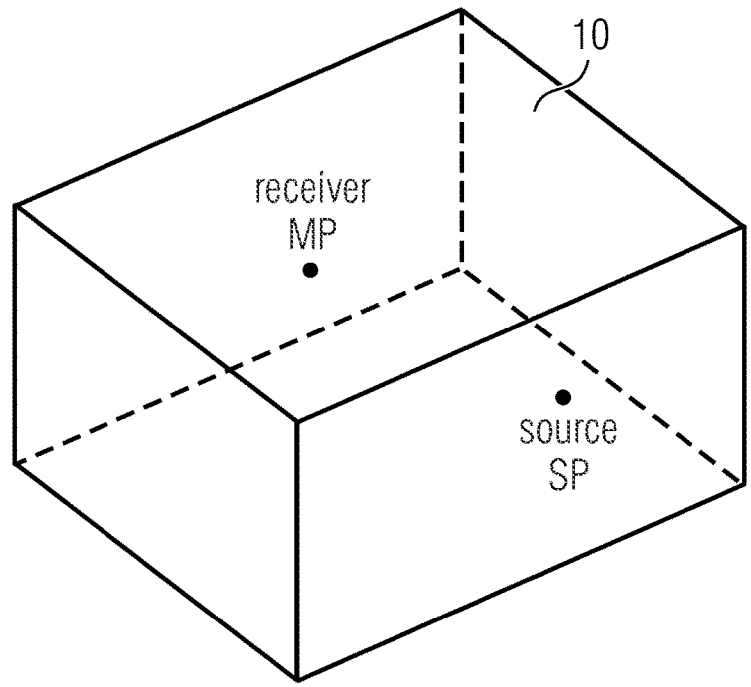
Fig. 5a

METHOD FOR DETERMINING A SOUND FIELD

CROSS-REFERENCE TO RELATED APPLICATIONS

This application is a continuation of copending International Application No. PCT/EP2021/082316, filed Nov. 19, 2021, which is incorporated herein by reference in its entirety, and additionally claims priority from European Application No. 20209000.7, filed Nov. 20, 2020, which is also incorporated herein by reference in its entirety.

TECHNICAL FIELD

Embodiments of the present invention refer to a method for determining a sound field in an enclosed space or at a target position within the enclosed space. Another embodiment refers to a corresponding determiner. Further embodiments refer to a computer program for performing the method and to a system comprising the above determiner. Embodiments refer to a method for estimating, monitoring, and controlling the sound field in a listening space. In general, the method relates to audio signal processing and applications of acoustic simulations.

BACKGROUND OF THE INVENTION

When an audio device emits sound into a closed listening space, the characteristics of that space will influence the sound field generated by the device. Surfaces present in the space will reflect sound and, in a frequency dependent manner, generate locations of emphasized or reduced sound. Additionally, surface impedances will determine the number of significant reflections and will therefore determine the reverberation time. (Note, surface impedance is a quantification of the ability of a surface to impede an impinging acoustic wave. This quantity is complex, where the real part describes the surface's acoustic resistance, and the imaginary part describes the surface's acoustic reactance.) These effects can, e.g., reduce the quality of a listening experience. For audio applications, it is beneficial to be able to control the acoustic responses at specific positions in the sound field.

One way to control the sound field would be to make changes to the interior design of a space (e.g., by adding room acoustic treatment, or by changing the room structure). Often, such a change is not desired or not possible. Additionally, it is common that the acoustic properties of a sound emitting source cannot easily be changed. However, e.g., in audio reproduction scenarios, the signal(s) that is (are) emitted by such a sound source can be influenced. With specific signal treatment, unwanted influences of the room or the sound emitting source on the perceived reproduction quality can be mitigated.

When the resulting acoustic response at some measurement position (MP) in the space is known, steps can be taken to digitally control the signal emitted by the source. This is commonly referred to as (digital) room correction, or as room compensation, or as room calibration. Knowledge of the acoustic response at a position can be obtained by measurement, using, e.g., a microphone. However, if the position of interest (e.g., a listening position) changes, the acoustic response is measured again, this time at the new position.

To be able to control the sound field over the whole space entails knowledge of the acoustic response throughout the space. Obtaining this information by measurement is not practical. Therefore, there is a need for an improved approach.

Before discussing the improved approach, the known technology will be discussed. The known technology comprises methods for room geometry inference that are known in the state of the art and are not further detailed here. Furthermore, methods for surface impedance measurement or estimation based on measurements at multiple positions within a space are known in the state of the art. However, there is no published in-situ method that performs an impedance estimation based on a pressure measurement at a single position. Methods for equalization of audio signals are known in the state of the art, as well. However, those aim at equalizing at measured positions, or at equalizing global features.

The following are three example patent applications that are related to the steps described above.

US2006126858A describes a method for estimating the volume and dimension of a room. In a first step, the number of reflections present in a measured impulse response is determined. Based on the number of reflections, the volume of the room is estimated. Additionally, it is claimed that the room dimensions and absorption coefficients can be determined from the room volume. The method depends on solving an image source model, and is therefore restricted to use in the high-frequency region of the sound field, due to the inability of the image source method to model modal effects.

US2012296600A describes a method for determining the absorption and transmission coefficients at a specific position in an acoustic field generated by a sound emitting source. The method comprises measurements of the sound pressure and particle velocity at the position of interest. Fourier transformation is then performed on the measured quantities, and the result is used to obtain a time averaged incident intensity in a certain direction. From this information, the absorption and transmission coefficients at a specific location are determined. Thus, if the surface absorption is used, a measurement is made at the surface.

US2005157891A describes a method for digital equalization of sound from loudspeakers in rooms. This is achieved by measuring an impulse response at a specific position in a room, and generating a set of filter parameters that can be used to equalize the sound at that specific position.

Summary of the state of the art: the volume and dimensions of a room, and absorption coefficient of a surface, can be estimated from measured impulse responses. Additionally, the sound field at a specific location in a room can be controlled, using digital equalization, based on a measurement at that specific location.

It is an objective of the present invention to provide a concept to determine or control the sound field over a (enclosed) space.

SUMMARY

According to an embodiment, a method for determining and/or monitoring a sound field in an enclosed space or at a target position within the enclosed space may have the steps of: obtaining data representing at least one acoustic measurement at a single one measurement position within the enclosed space having an unknown acoustic environment and/or an unknown single one measurement position to obtain an interim value set; obtaining a room geometry of the enclosed space as second parameter describing the enclosed space; wherein obtaining the room geometry either has receiving the room geometry from an input or estimating the room geometry based on interim values of the interim value set; obtaining a surface impedance as first parameter describing the enclosed space, wherein obtaining the surface impedance has estimating the surface impedance based on the interim values of the interim value set; determining a model of the enclosed space based on the first parameter and the second parameter; and estimating a sound field throughout the enclosed space based on the model of the enclosed space, the sound field describing a sound characteristic for one or more positions within the enclosed space.

According to another embodiment, a method for monitoring a sound field in an enclosed space or at a target position within the enclosed space may have the steps of: obtaining data representing at least two acoustic measurement at a single one measurement position within the enclosed space having an unknown acoustic environment and/or an unknown single one measurement position to obtain an actual interim value set; obtaining a room geometry of the enclosed space as second parameter describing the enclosed space, wherein obtaining the room geometry either has receiving the room geometry from an input or estimating the room geometry based on interim values of the interim value set; obtaining a surface impedance as first parameter describing the enclosed space; wherein obtaining the surface impedance has estimating the surface impedance based on the interim values of the interim value set; and estimating a change in the first parameter and/or the second parameter based on an analysis of the actual interim value set taking into account a previously determined interim value set.

Another embodiment may have a non-transitory digital storage medium having stored thereon a computer program for performing a method for determining and/or monitoring a sound field in an enclosed space or at a target position within the enclosed space, the method having the steps of: obtaining data representing at least one acoustic measurement at a single one measurement position within the enclosed space having an unknown acoustic environment and/or an unknown single one measurement position to obtain an interim value set; obtaining a room geometry of the enclosed space as second parameter describing the enclosed space; wherein obtaining the room geometry either has receiving the room geometry from an input or estimating the room geometry based on interim values of the interim value set; obtaining a surface impedance as first parameter describing the enclosed space, wherein obtaining the surface impedance has estimating the surface impedance based on the interim values of the interim value set; determining a model of the enclosed space based on the first parameter and the second parameter; and estimating a sound field throughout the enclosed space based on the model of the enclosed space, the sound field describing a sound characteristic for one or more positions within the enclosed space, when the computer program is run by a computer.

Still another embodiment may have a non-transitory digital storage medium having stored thereon a computer program for performing a method for monitoring a sound field in an enclosed space or at a target position within the enclosed space, the method having the steps of: obtaining data representing at least two acoustic measurement at a single one measurement position within the enclosed space having an unknown acoustic environment and/or an unknown single one measurement position to obtain an actual interim value set; obtaining a room geometry of the enclosed space as second parameter describing the enclosed space, wherein obtaining the room geometry either has receiving the room geometry from an input or estimating the room geometry based on interim values of the interim value set; obtaining a surface impedance as first parameter describing the enclosed space; wherein obtaining the surface impedance has estimating the surface impedance based on the interim values of the interim value set; and estimating a change in the first parameter and/or the second parameter based on an analysis of the actual interim value set taking into account a previously determined interim value set, when the computer program is run by a computer.

According to another embodiment, a determiner for monitoring a sound field in an enclosed space or at a target position within the enclosed space may have: an interface for receiving data representing at least two acoustic measurement from a single one measurement position within the enclosed space having an unknown acoustic environment and/or an unknown single one measurement position to obtain an interim value set; a processor configured to obtain a room geometry of the enclosed space as second parameter describing the enclosed space, wherein obtaining the room geometry either has receiving the room geometry from an input or estimating the room geometry based on interim values of the interim value set, and a surface impedance as first parameter describing the enclosed space, wherein obtaining the surface impedance has estimating the surface impedance based on the interim values of the interim value set; and to determine a model of the enclosed space based on the first and the second parameter; wherein the processor is further configured to estimate a sound field throughout the enclosed space based on the model of the enclosed space, the sound field describing a sound characteristic for one or more positions within the enclosed space.

According to another embodiment, a system may have an inventive determiner as mentioned above and at least one device including playback means and/or recording means for performing the acoustic measurement; or an inventive determiner as mentioned above and a device including playback means and/or recording means for performing the acoustic measurement, wherein the determiner is implemented on processor; or an inventive determiner as mentioned above and an adaptive equalizer configured to determine an audio adaption parameter based on the determined sound field, and to adapt an audio signal based on the audio adaption parameter so as to adapt an acoustic reproduction to a target position.

According to another embodiment, a method for determining and/or monitoring a sound field in an enclosed space or at a target position within the enclosed space may have the steps of: obtaining data representing at least one acoustic measurement at at least one measurement position within the enclosed space having an unknown acoustic environment and/or an unknown single one measurement position or at a single one measurement position within the enclosed space having an unknown acoustic environment and/or an unknown single one measurement position to obtain an interim value set; obtaining a room geometry of the enclosed space as second parameter describing the enclosed space; wherein obtaining the room geometry either has receiving the room geometry from an input or estimating the room geometry based on interim values of the interim value set; obtaining a surface impedance as first parameter describing the enclosed space, wherein obtaining the surface impedance has estimating the surface impedance based on the interim values of the interim value set; determining a model of the enclosed space based on the first and the second parameter; and estimating a sound field throughout the enclosed space based on the model of the enclosed space, the sound field describing a sound characteristic for one or more positions within the enclosed space; wherein the step of obtaining the interim value set has a determination of one or more resonant frequencies and one or more damping coefficients, wherein the step of determining the one or more resonant frequencies and one or more damping frequencies has fitting a function to an impulse response, wherein the function has the form of $h(t)=\Sigma_{i=1}^{M}A_i e^{\sigma_i t} \cos(\omega_i t+\phi_i)$, where M is the number of modes, $A_i$ is the amplitude of modular component, $\sigma_i$ is the damping coefficient, $\omega_i$ is the resonant frequency, and $\phi_i$ is the phase; or wherein obtaining the surface impedance has an acoustic surface impedance estimation based on eigenvalue approximation.

According to another embodiment, a determiner for determining and/or monitoring a sound field in an enclosed space or at a target position within the enclosed space may have: an interface for receiving data representing at least one acoustic measurement from at least one measurement position within the enclosed space having an unknown acoustic environment and/or an unknown single one measurement position or from a single one measurement position within the enclosed space having an unknown acoustic environment and/or an unknown single one measurement position to obtain an interim value set; a processor configured to obtain a room geometry of the enclosed space as second parameter describing the enclosed space, wherein obtaining the room geometry either has receiving the room geometry from an input or estimating the room geometry based on interim values of the interim value set, and a surface impedance as first parameter describing the enclosed space, wherein obtaining the surface impedance has estimating the surface impedance based on the interim values of the interim value set; and to determine a model of the enclosed space based on the first and the second parameter; wherein the processor is further configured to estimate a sound field throughout the enclosed space based on the model of the enclosed space, the sound field describing a sound characteristic for one or more positions within the enclosed space; wherein the step of obtaining the interim value set has a determination of one or more resonant frequencies and one or more damping coefficients, wherein the step of determining the one or more resonant frequencies and one or more damping frequencies has fitting a function to an impulse response, wherein the function has the form of $h(t)=\Sigma_{i=1}^{M}A_i e^{\sigma_i t} \cos(\omega_i t+\phi_i)$, where M is the number of modes, $A_i$ is the amplitude of modular component, $\sigma_i$ is the damping coefficient, $\omega_i$ is the resonant frequency, and $\phi_i$ is the phase; or wherein obtaining the surface impedance has an acoustic surface impedance estimation based on eigenvalue approximation.

According to another embodiment, a method for determining and/or monitoring a sound field in an enclosed space or at a target position within the enclosed space may have the steps of: obtaining data representing at least one acoustic measurement at at least one measurement position within the enclosed space having an unknown acoustic environment and/or an unknown single one measurement position or at a single one measurement position within the enclosed space having an unknown acoustic environment and/or an unknown single one measurement position to obtain an interim value set; obtaining a room geometry of the enclosed space as second parameter describing the enclosed space; wherein obtaining the room geometry has estimating the room geometry based on interim values of the interim value set; obtaining a surface impedance as first parameter describing the enclosed space, wherein obtaining the surface impedance has estimating the surface impedance based on the interim values of the interim value set; determining a model of the enclosed space based on the first and the second parameter; and estimating a sound field throughout the enclosed space based on the model of the enclosed space, the sound field describing a sound characteristic for one or more positions within the enclosed space.

According to another embodiment, a determiner for determining and/or monitoring a sound field in an enclosed space or at a target position within the enclosed space may have: an interface for receiving data representing at least one acoustic measurement from at least one measurement position within the enclosed space having an unknown acoustic environment and/or an unknown single one measurement position or from a single one measurement position within the enclosed space having an unknown acoustic environment and/or an unknown single one measurement position to obtain an interim value set; a processor configured to obtain a room geometry of the enclosed space as second parameter describing the enclosed space, wherein obtaining the room geometry has estimating the room geometry based on interim values of the interim value set, and a surface impedance as first parameter describing the enclosed space, wherein obtaining the surface impedance has estimating the surface impedance based on the interim values of the interim value set; and to determine a model of the enclosed space based on the first and the second parameter; wherein the processor is further configured to estimate a sound field throughout the enclosed space based on the model of the enclosed space, the sound field describing a sound characteristic for one or more positions within the enclosed space.

An embodiment of the present invention provides a method for determining and/or monitoring a sound field in a (enclosed) space or at a target position within said (enclosed) space. The method comprises the steps of:

Obtaining acoustic measurement data or performing an acoustic measurement

Obtaining or estimating a surface impedance

Obtaining or estimating a room geometry

Determining a model

Estimating a sound field or a change of same.

The acoustic measurement is performed at at least one measurement position within the (enclosed) space or, at a single one measurement position within the (enclosed) space. It has the purpose to obtain an interim value set, e.g., comprising one or more resonant frequencies and/or one or more damping coefficients and/or one or more (measured) impulse responses. Alternatively, a simulation to obtain acoustic measurement data can be performed. The determination/estimation of the surface impedance may be based on the interim value set. Alternatively information on the surface impedance may be received. The surface impedance(s) are first parameter(s) describing the (enclosed) space. According to embodiments, another (second) parameter describing the (enclosed) space may be obtained, namely the geometry (also based on the interim value set or an externally received information). The geometry information (second parameter(s)) may optionally comprise a source location information. The model of the (enclosed) space is based on the first parameter and the second parameter. The estimation of the sound field throughout the (enclosed) space is based on the model (and a source information, like a source position or measured impulse response generated using the source, cf. second parameter), wherein the sound field describes a sound characteristic for a plurality or all of the positions within the (enclosed) space. Note that obtaining means either receiving from an input (e.g. externally measured) or estimation based on interim values. This method may also be used to monitor the sound field e.g. for material classification.

Embodiments of the present invention are based on the principle that based on an acoustic measurement at (at least one) measurement position, but without having to perform acoustic measurements throughout the space or at the target position, enough information can be gained to estimate the global sound field in the (enclosed) space. By use of this sound field it is possible to simulate the sound characteristic at the specific target position in the (enclosed) space, e.g., within an acoustic environment, a listening environment, a measurement environment, etc. This is achieved by extrapolating (resp. inferring) the global acoustic behavior or the acoustic behavior at the intended target position (TP) from the at least one measurement at a measurement position (MP), which might be different from the target position, and acoustic simulations. In detail: the surface impedance of the listening space and/or the geometry of the listening space can be determined from a single measurement, e.g., of an impulse response at (at least) a single (arbitrarily chosen) position. Based on this information and combined with the knowledge of the source position(s), a computer model of the space can be generated. The model is used to determine the sound field at any position in the space, without the need to measure each position.

According to embodiments, the source information comprises a (measured, cf. acoustic measurement) impulse response and/or an information on the source position.

According to embodiments, a source position as a part of the second parameter or source positions as parts of the second parameters describing the (enclosed) space can be determined, wherein the determination of the model is performed taking into account the source position.

According to an embodiment, the method further comprises the step of performing another acoustic measurement to obtain another interim value set and updating the estimated sound field based on an updated model, wherein the model is updated based on an updated first parameter. This enables to beneficially determine changes to a listening space by monitoring the geometry and surface impedance of the space. The computer model is then updated and used to determine the changed sound field at any position in this space.

According to embodiments, the step of obtaining the interim value set comprises a determination of one or more resonant frequencies and one or more damping coefficients, wherein the step of determining the one or more resonant frequencies and one or more damping coefficients comprises fitting a function to the impulse response, wherein the function has the form of $h(t)=\Sigma_{i=1}^{M} A_i e^{\sigma_i t} \cos(\omega_i t + \phi_i)$, where M is the number of modes, $A_i$ is the amplitude of modular component i, $\sigma_i$ is the damping coefficient, $\omega_i$ is the resonant frequency, and $\phi_i$ is the phase. According to further embodiments, the step of estimating the surface impedance comprises an in-situ impedance estimation based on one or more resonant frequencies and one or more damping coefficients.

According to additional embodiments, the in-situ impedance estimation is based on the following formula $$\tilde{\omega}_i^{(1)} = \omega_i^{(0)} \frac{B_{ii}^{(0)}}{B_{ii}^{(1)}},$$

wherein $\tilde{\omega}_i^{(1)}$ is the complex quantity comprising the estimated resonant frequency and its associated damping coefficient, $\omega_i^{(0)}$ is a hard-walled resonant frequency, $B_{ii}^{(0)}$ is a function of the geometry of the space, and $B_{ii}^{(1)}$ depends on the geometry and surface impedance of the space.

According to alternative embodiments, estimating the surface impedance comprises an acoustic surface impedance estimation based on eigenvalue approximation.

According to another variant, the eigenvalue approximation is based on $$\tilde{\omega}_j^{(1)} = \omega_j^{(0)} \frac{B_{jj}^{(0)}}{B_{jj}^{(1)}},$$

where $\tilde{\omega}_j^{(1)}$ is the complex quantity comprising the estimated resonant frequency and its associated damping coefficient, $\omega_j^{(0)}$ is a hard wall resonant frequency, $B_{jj}^{(0)}$ is a resonant function of a geometry of the space and $B_{jj}^{(1)}$ depends on the geometry and surface impedance of the space. Alternatively, the estimation of the surface may comprise analyzing damping coefficients.

It should be noted that according to embodiments, the room geometry may be estimated. Alternatively, the room geometry may be determined based on the calculation using an analytic solution for the resonant frequency $$\omega_i = \omega_{n_x,n_y,n_z} = c\pi \sqrt{\left(\frac{n_x}{L_x}\right)^2 + \left(\frac{n_y}{L_y}\right)^2 + \left(\frac{n_z}{L_z}\right)^2},$$

where c is the speed of sound, $n_j$=0, 1, 2, . . . determine the order of the acoustic modes supported by the space, and where $L_j$ are the unknown dimensions of the geometry. Note this formula especially describes the resonant frequency of shoebox shaped rooms.

According to embodiments, determining the model is based on a finite element method, a finite difference method, or any method for modelling wave phenomena.

It should be noted that according to embodiments, the model may be detailed enough to provide reliable estimations, if the correction applied to the input signal is to be valid. Acoustic models are typically based on the room geometry, surface impedance values, and a source description as input parameters. The source description is generally available and can be quantified without knowledge of a specific listening space (for example, by way of measurement in an anechoic chamber). The room geometry can either be based on a user input, or, for unknown environments, it could automatically be estimated using a room geometry inference method, while the surface impedance values can be estimated using an impedance estimation method.

It should be noted that, according to an embodiment based on at least one single point measurement, the properties at different positions can be estimated. According to further embodiments, this enables an adaptation of the equalization of a playback system. The single point measurement is sufficient to estimate the remote IR (remote impulse response), wherein this estimation can be used for a plurality of applications.

According to embodiments, the method further comprises the step of outputting an acoustic test signal.

According to embodiments, the performed measurement comprises the measurement of the impulse response.

According to embodiment, the method further comprises the step of determining an audio adaption parameter based on the determined sound field, wherein the audio adaption parameter(s) enables by use of same an adaption of an acoustic reproduction to a target position within the enclosed space or multiple positions of the enclosed space.

Additionally or alternatively, determining a set of filter parameters based on the determined sound field, wherein the filter parameters enable an adaption of an acoustic reproduction by use of the filter parameter set to a target position within the enclosed space or to the complete/global enclosed space.

Of course, the above-described methods may be computer implemented. Therefore, an embodiment provides a computer program for performing the above-described methods or steps of the above-described methods.

Another embodiment provides a determiner for determining a sound field in a (enclosed) space or at a target position within said (enclosed) space. A system comprising a determiner and an acoustic reproduction device including playback means, like one or more loudspeaker drivers and/or recording means, like one or more microphones for performing the acoustic measurement. Note the playback means and the recording means may be implemented into one entity (like a smart speaker) or into two separate entities (one for playback, the other for recording).

Note that in specific implementations, the same transducer(s) may be used as playback means and recording means. Furthermore, the obtaining/determining/estimating steps may be outsourced to a server. This server can be hosted in a space remote from the enclosed space. The data can be transmitted via any telecommunication means. The server may perform the obtaining/determining/estimating with or without the use of artificial intelligence. The obtained data/results (e.g. the measurement data or the data describing the sound field) after performing the method may be used for building up databases to be used for application of artificial intelligence methods.

According to embodiments the steps of the above method are repeated so as to build a database comprising at least two data sets describing the sound fields for on room or a plurality of different rooms.

Another embodiment provides a system comprising the determiner and the microphone for performing the measurement. The determiner may be configured to calculate/extrapolate the sound field at the target position. Here, information regarding the target position may be used. Additionally or alternatively to the microphone, the system may comprise an acoustic reproduction device, like a loudspeaker comprising one or more transducers.

Another embodiment provides a method for monitoring a sound field (material classification) in an enclosed space (10) or at a target position (TP) within the enclosed space (10), comprising:
  Obtaining acoustic measurement data or performing an acoustic measurement
  Obtaining or estimating a surface impedance
  Obtaining or estimating a room geometry
  Estimating a change (of parameters derived from an actual interim value set with respect to a previously determined interim value set).

The estimation of the change may be based on an analysis of the actual interim value set taking into account a previously determined interim value set. Another embodiment refers to a corresponding determiner for monitoring a sound field.

BRIEF DESCRIPTION OF THE DRAWINGS

Embodiments of the present invention will subsequently be discussed referring to the enclosed figures, wherein

FIGS. 4b, 4c show a schematic block diagram for illustrating a measurement environment (with and without material sample) for illustrating embodiments;

FIG. 5a shows schematically a rectangular listening space with source and receiver positions indicated;

DETAILED DESCRIPTION OF THE INVENTION

Figure 1:
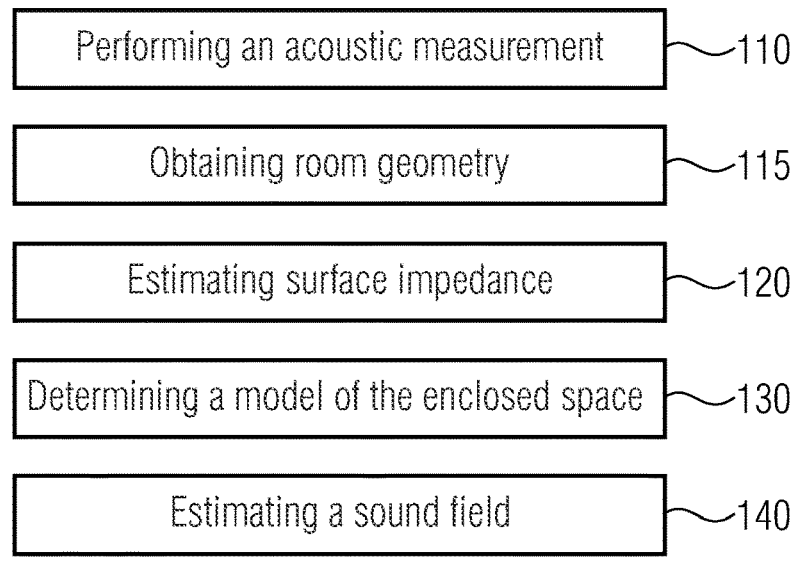
FIG. 1 shows a schematic flowchart illustrating the basic method for determining a sound field according to embodiments.

Before discussing embodiments in detail, it is mentioned that identical reference numerals are provided to objects having identical or similar functions, so that the description thereof is mutually applicable or interchangeable.

Figure 2A:
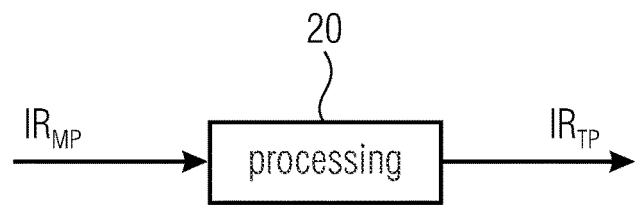
FIG. 2a shows a schematic block diagram illustrating a processing unit according to an embodiment.
Figure 2B:
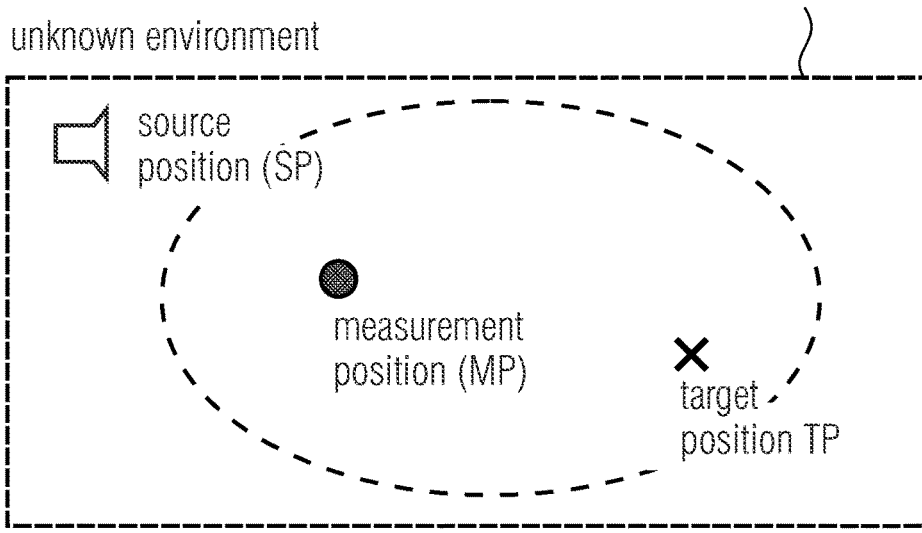
FIG. 2b shows a schematic block diagram of an unknown environment/enclosed space for illustrating embodiments.

FIG. 1 shows method 100 for determining a sound field in a (enclosed) space as it is illustrated by FIG. 2b and marked by the reference numeral 10. FIG. 2b exemplifies an impulse response measurement at a measurement position MP in an unknown acoustic environment (e.g., an enclosure or a room 10). The impulse response is the input to a processor (cf. FIG. 2a, reference numeral 20), which, according to embodiments as described in the following, calculates the impulse response at a non-observed, this means not measured, target position (TP).

The method 100 comprises five basic steps 110 to 140. The first step refers to performing an acoustic measurement and is marked by the reference number 110. After that, the step 115 can be performed for obtaining a room geometry. The result of this step is a second parameter describing the enclosed space, namely the room geometry. The third step refers to the estimation of a surface impedance(s) and is marked by the reference number 120. The result of this step 120 is the determination of a first parameter. It should be noted that this step 120 as well as the step 115 use as input the values, referred to as interim values set during the step 110. The interim values set can comprise a resonant frequency or plurality of frequencies and/or one or more damping coefficients, wherein the resonant frequencies and the damping coefficients characterize the behavior of the space/enclosed space/room. According to embodiments, the step 120 may use as input parameter the second parameter obtained during the step 115.

After that, a model of the enclosed space is determined (cf. step 130) using the first parameter (surface impedance) and the second parameter, i.e., the room geometry. Optionally, an information on the source position (as part of the second parameter) may be taken into account (note the source position is not needed for material characterization). Based on this model, a sound field can be estimated (cf. step 140), wherein the sound field describes the sound characteristic for a plurality or all positions within the space.

After that, the estimation of the sound field is mainly based on the previously determined (cf. step 130) model.

In a close listening space 10 (cf. FIG. 2b), e.g., a room, containing a sound emitting device SP, e.g., a loudspeaker, the sound field SF generated by the sound source SP is position dependent, i.e., depends on the position of a sound source SP as well as on the position of the receiver (measurement position MP/position of the microphone during the measurement or target position TP/position of the listener during reproduction).

If the considered sound source is an audio reproduction device, it is possible to modify the signal emitted by the device to control the sound field at specific positions within the space. To enable control at a specific position, information regarding the sound field at that specific position is needed. Said information can be obtained from the impulse response at that specific position. If control over a larger area is desired, impulse response measurements at many different control points throughout this area have to be obtained. The impulse response at a specific position of interest can be obtained by way of measurement, but if the position of interest changes, a new measurement is used.

The method 100 described in detail in the following makes use of computer modelling to remove the need for several measurements. Instead, at least one measurement 110 is performed for at least one position which does not necessarily have to be in the area of interest (cf. target position) and information extracted from the recorded impulse response(s) is used to estimate the sound field SF through the entire space 10. The computer model uses descriptions of the geometry (cf. step 115) and surface impedance values (cf. step 120) of the space 10. The geometry of the space 10 and the surface impedance(s) can be estimated based on the impulse response measurement(s). The obtained computer model of the listening space 10 can be solved to determine the acoustic response at any position in the space 10.

This knowledge enables digital control of the acoustic response throughout the space 10.

The computer model is determined as follows, namely by the method 100 comprising the steps of 1. Estimating surface impedance values 120 of the space 10, based on at least one measurement 110 and advantageously, but not necessary, a known geometry regarding the information about the room geometry. This can either be obtained from specific geometric data as input data (e.g., dimensions, or a Computer Aided Design (CAD) model of the space), or be based on user input, or in an automized fashion be obtained by inferring the room geometry from either acoustical (room impulse response(s)) data, or other sensor (e.g., optical) data. The actual method to obtain the geometry is not relevant for the method described in the following. Furthermore, the position of the source(s) (in the environment) may be used, e.g. in case for equalization application.

2. Using this information to build a model (cf. step 130) of the space, the solution of which can be used to predict or control the sound field at any desired position (cf. step 140) in the space 10.

The entire method can be performed by an entity 20. This is illustrated by FIG. 2a showing a processing entity 20 receiving impulse response information measured/obtained at the measurement position (cf. $IR_{MP}$). This $IR_{MP}$ data is processed using the entity 20 so as to obtain an impulse response at the target position $IR_{TP}$. The $IR_{TP}$ describes the characteristic of the sound field at the target position TP (cf. FIG. 2b)

In a practical application (one embodiment), e.g., the adaptation of the performance of an audio playback system to a specific room, more detailed steps would be:

1. Measure Impulse Response(s) (IR(s))
2. Obtain room geometry and source position (by input or inference from the measurement(s) made in step 1.)
3. Obtain surface impedance (by input or inference)
4. Build and solve a model to predict the sound field at specific positions
5. Use this information to enhance the listening experience Alternatively, the (complex) frequency response, or transfer function, is used for some modifications. However, the frequency response/transfer function can be calculated from the impulse response, and both representations of the sound field contain the same information.

Note different methods for room transfer function modeling (especially in the low frequency range) are known from literature, e.g. wave-based methods, phase-aware geometrical methods, pole-zero filter modeling, and analytical modeling. A starting point for most of these methods comprises knowledge of the geometry of the room, and more essentially a description of reflection properties of the walls, which are best described by the surface impedances of these walls.

The described method can be used in numerous applications related to the fields of, e.g., room acoustics research, sound reproduction, material classification, etc. Such, based on at least one measurement, e.g., apparatus or processor that performs specific processing that is adapted for the sound field at specific positions in an environment/an acoustic environment/acoustic space/a listening environment (e.g. position-dependent processing) even though signals containing information about the sound field at the TP have not been measured or are not available, e.g., an audio system's performance can be adjusted to be best suited for at least one different position (remote from a measurement position) in the same listening environment, e.g., the acoustic behavior in other positions or the complete space can be simulated (e.g. for auralization, virtual reality or augmented reality applications).

According to further embodiments, based on at least two measurements that are separated in time, e.g., changes to a listening setup or listening environment, e.g., a moved acoustic source (or sources), or the addition or removal of sound absorbing objects, can be detected.

e.g., an audio system's performance can be readjusted to account for detected changes, anywhere in the complete space, e.g., changes in the acoustic environment can be detected, which could be used for, e.g., acoustic characterization of materials or objects This means that the method 100 including the step 110 and updating steps 115 to 120 can be performed in order to determine whether the current situation has changed. There might be an additional step comparison of a stored set of room parameters to a recently measured set.

The inference of the sound field (impulse response) at the target position TP from the measurement at the measurement position MP is based on the steps as detailed above.

According to further embodiments, the method can be enhanced. This is further exemplified in FIG. 3 for the case that the geometry information and the impedance information are based on the recorded impulse response(s).

Figure 3:
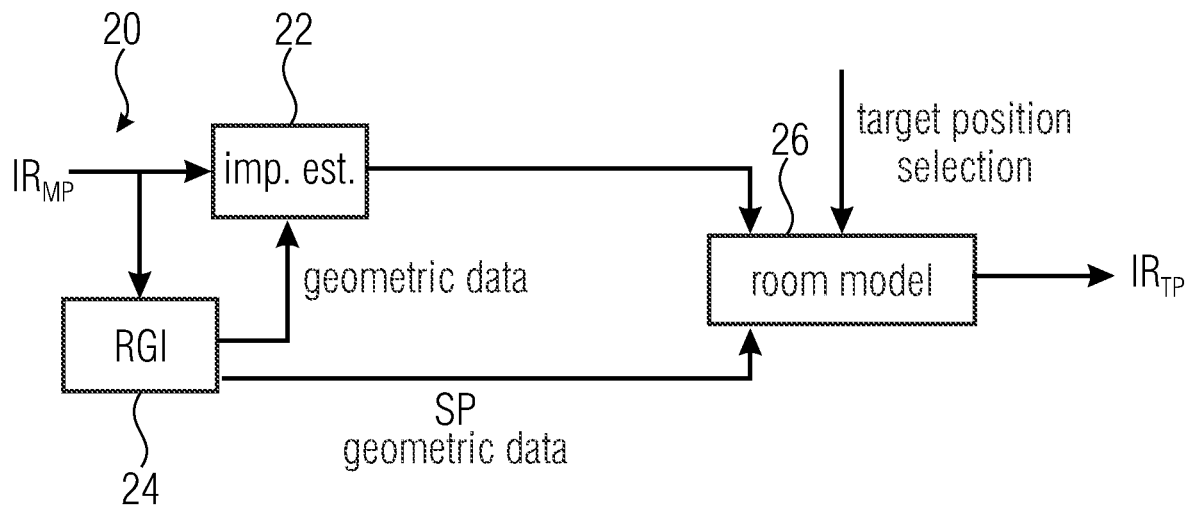
FIG. 3 shows a schematic block diagram of a determiner for determining a sound field according to enhanced embodiments.

FIG. 3 shows the calculation performed by the processor 20. Within a processor 20, three steps are performed, namely the impedance estimation (cf. entity 22) as well as the room geometry estimation (cf. entity 24). Expressed in other words, this means that the entity 20 comprises an impedance estimator 22, a room geometry determiner 24, as well as a room model determiner 26.

The impedance estimation 22 uses as input the $IR_{MP}$ and the geometric data is determined using the RGI 24 (RGI=Room Geometry Inference), while the RGI just uses the $IR_{MP}$. Both pieces of information, namely the impedance estimation result (first parameter) as well as the geometric data (second parameter), are used for determining the room model (cf. entity 26). According to embodiments, the room model determiner additionally uses the one or more source positions SP (part of the second parameter) known or determined using the RGI 24. Note the RGI 24 may determine the source position together with the geometry. The room model determiner is configured to determine the sound field based on the first, second parameters and especially the target position TP. Therefore, a target position selector may be used to inform the room model determiner 26 for which target position the sound field should be determined.

Regarding the functionality of the entity 20, it should be noted that this entity 20 mainly performs the method 100 of FIG. 1. Here, the step of estimating the surface impedance is performed by the block 22, wherein the impedance estimation step uses information about the room geometry as an input. The step 115 is inferred in the block 24 from the impulse response measurement $IR_{MP}$. With the estimated surface impedance information, the estimated room geometry, and the estimated information about the source position inside the geometry, the room can be modeled (cf. step 130), and the impulse response at any desired position (which can be specified, e.g., by a user input) can be estimated. According to embodiments, a tracked scenario wherein the current position of the listener is being tracked, and this information is sent to the processor 20 is possible as well. This enables that the performance of the playback system can be optimally adapted to the current listening position.

According to further embodiments, additionally, by comparing the room properties (identified by analyzing at least one measured IR) of an acoustic environment at two different instants in time, changes to the environment can be detected. Note, that the room properties of a space is the combination of physical characteristics that can be attributed to the space. Another embodiment refers to the combination of geometry, resonant frequencies, mode shapes, and modal damping coefficients of a space.

For example, using the method described above, an empty acoustic space can be characterized (in terms of its geometrical shape and the impedance of its bounding surfaces). If an object which modifies the estimated room properties of the space is added to the space, a second application of the method can be used to detect that the acoustic space has changed.

Figure 4A:
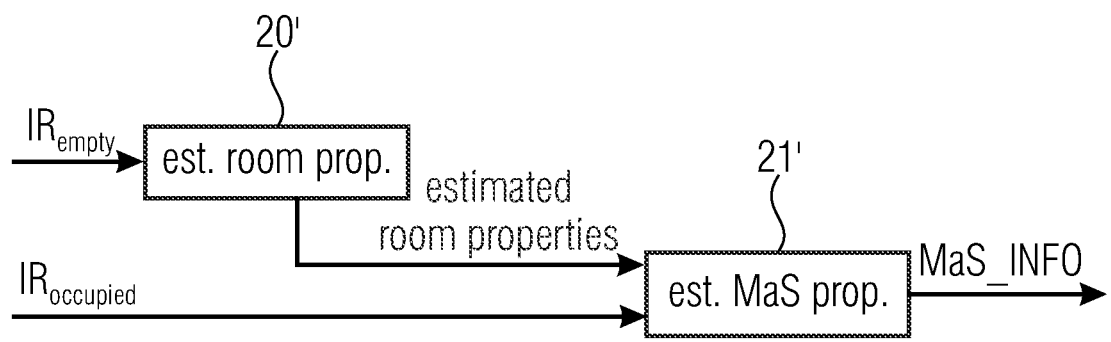
FIG. 4a shows another block diagram for illustrating a determiner according to other embodiments.

A flow diagram of an example application is given in FIGS. 4a, 4b and 4c.

FIG. 4a shows the room estimator 20' receiving the impulse response for an empty room $IR_{EMPTY}$, and outputting the estimated room properties. The room estimator 20' is comparable to the room estimator 20 of FIG. 3, wherein the room estimator 20' does not use/need the source position SP and/or the target position TP. The measurement situation of the empty room is shown by the room 10 of FIG. 4b. By use of the estimator 21' a change of material sample(s) within the room can be determined. For this the entity 21' compares the room properties for an empty room $IR_{EMPTY}$ with the newly estimated room properties of an occupied room $IR_{OCCUPIED}$. Such a room is illustrated by FIG. 4c showing the additional material sample 11. By use of this $IR_{OCCUPIED}$, the estimated room properties are updated and output as MaS_INFO.

According to embodiments, the properties of an empty measurement environment (or room) are estimated, based on an analysis of the IR measured in the empty environment (or room). In a second step, a material sample that changes the sound field is placed in the environment (or room), and the IR of the environment with material sample (or occupied room) is measured and analyzed to determine either the changed properties of the room, or to estimate the unknown properties of the sample material.

With respect to FIG. 5a to 5F, the embodiments are described in more detail and focus on the information extracted from the measurement and analysis of the impulse response.

FIG. 5a illustrates a rectangular enclosure or listening space 10 with source and receiver positions SP and MP. The source emits a test signal into the acoustic space and the signal at the receiver position (i.e. measurement position MP) is measured. This measurement is performed once. The source SP would typically be a loudspeaker, and the receiver would typically be a microphone. The test signal could be a swept sinusoid, an impulse, or any other test signal with the features to recover an impulse response from the measured signal.

Note that, although the example given here makes use of a rectangular room, the method is not limited to spaces of this shape; no restrictions are placed on the shape of the acoustic space being analyzed.

Figure 5B:
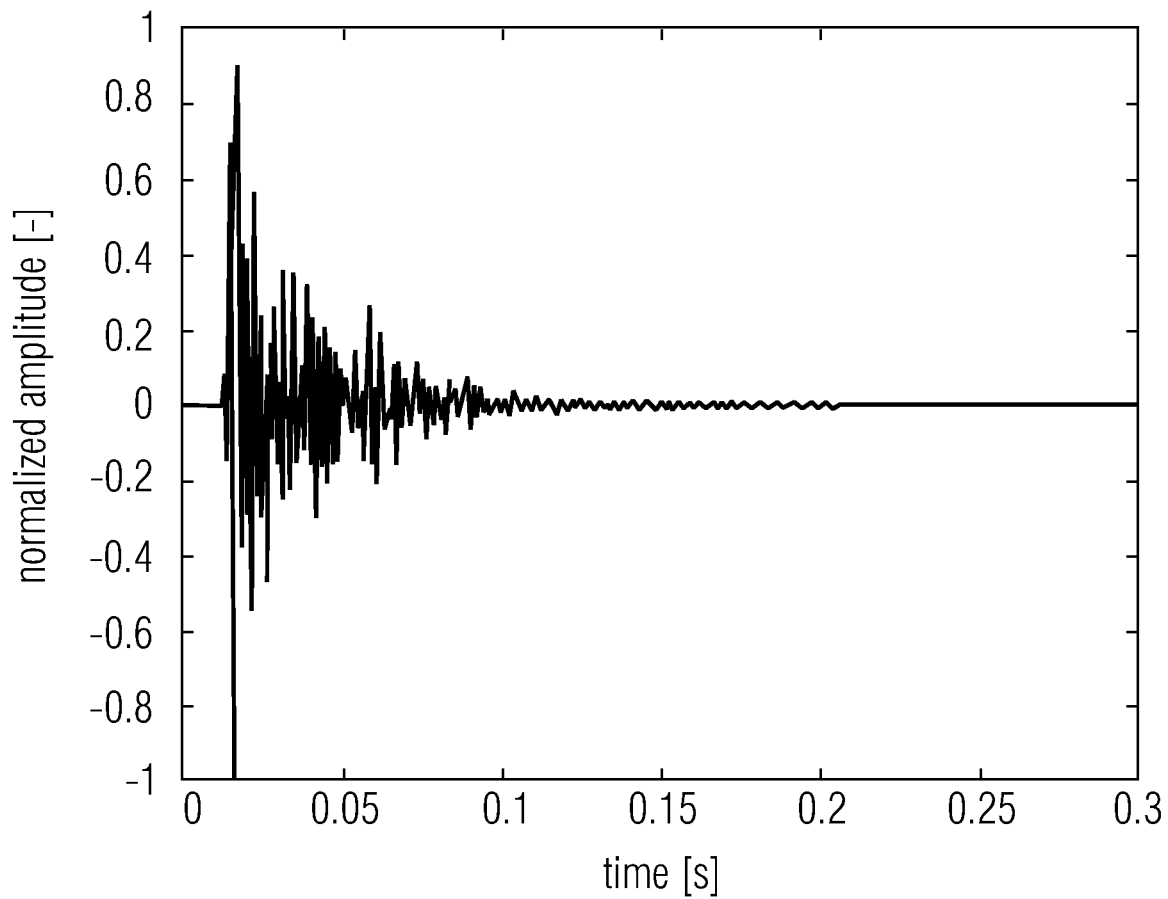
FIG. 5b shows an exemplified impulse response for specific source and listening positions.

FIG. 5b illustrates a plot of an impulse response, measured at the receiver position indicated in FIG. 5a. The impulse response contains information related to the geometry and surface impedance of the acoustic space.

Figure 5C:
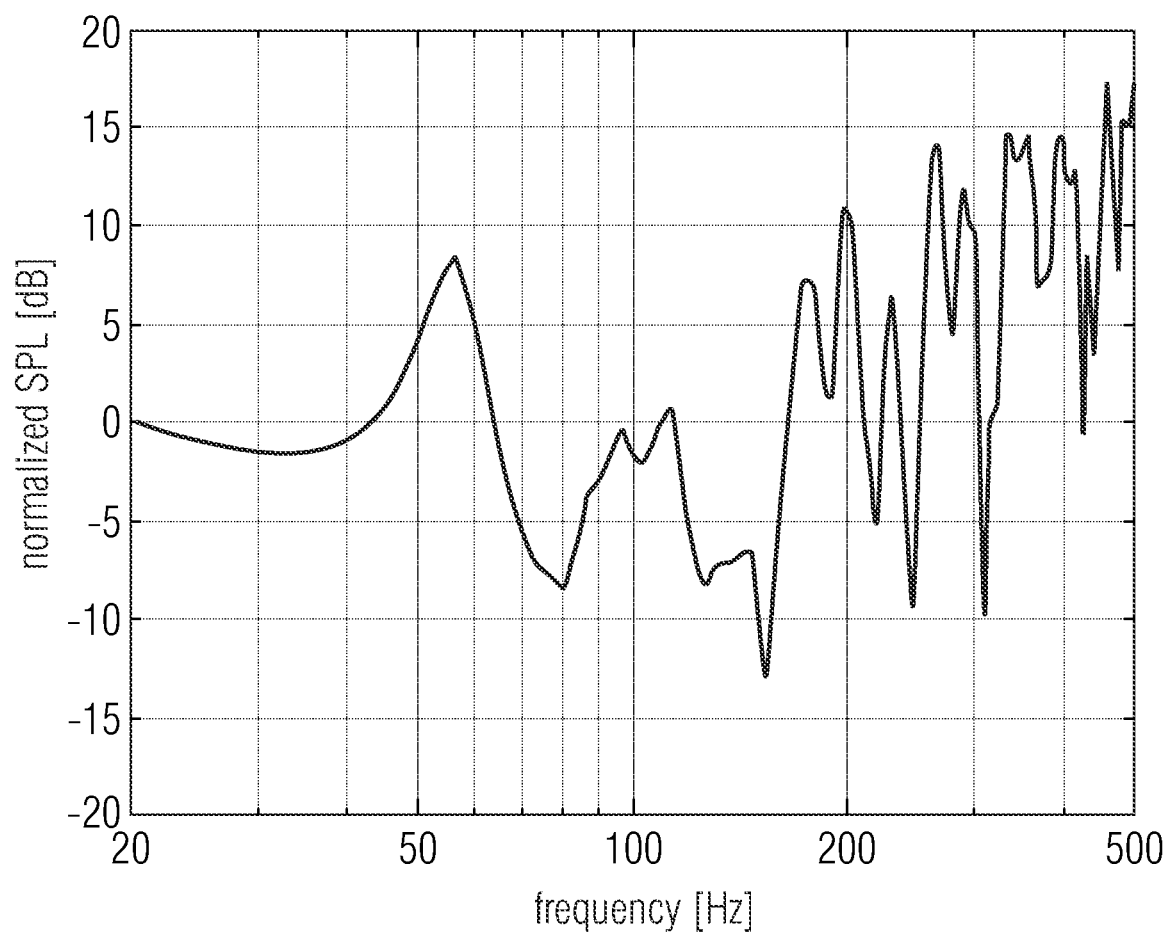
FIG. 5c shows an exemplified transfer function for specific source and listening positions.

FIG. 5c is the magnitude of the transfer function, obtained by Fourier transformation of the measured impulse response, shown in FIG. 5b. The peaks and their quality factors are determined by the geometry and surface impedance(s) of the acoustic space. Note that, the quality factor is a dimensionless parameter that describes the damping of a resonant mode. A steep peak, or large quality factor, would indicate a lightly damped mode, while a broad, shallow peak, or small quality factor, would indicate a heavily damped mode. The frequency locations of the peaks are determined by the resonant frequencies of the space, and their quality factors are related to the damping coefficients of the resonating modes of the space.

Although within above embodiments the processing has been discussed with respect to low frequency it should be noted that the processing may also be used for high frequency processing.

Figure 5D:
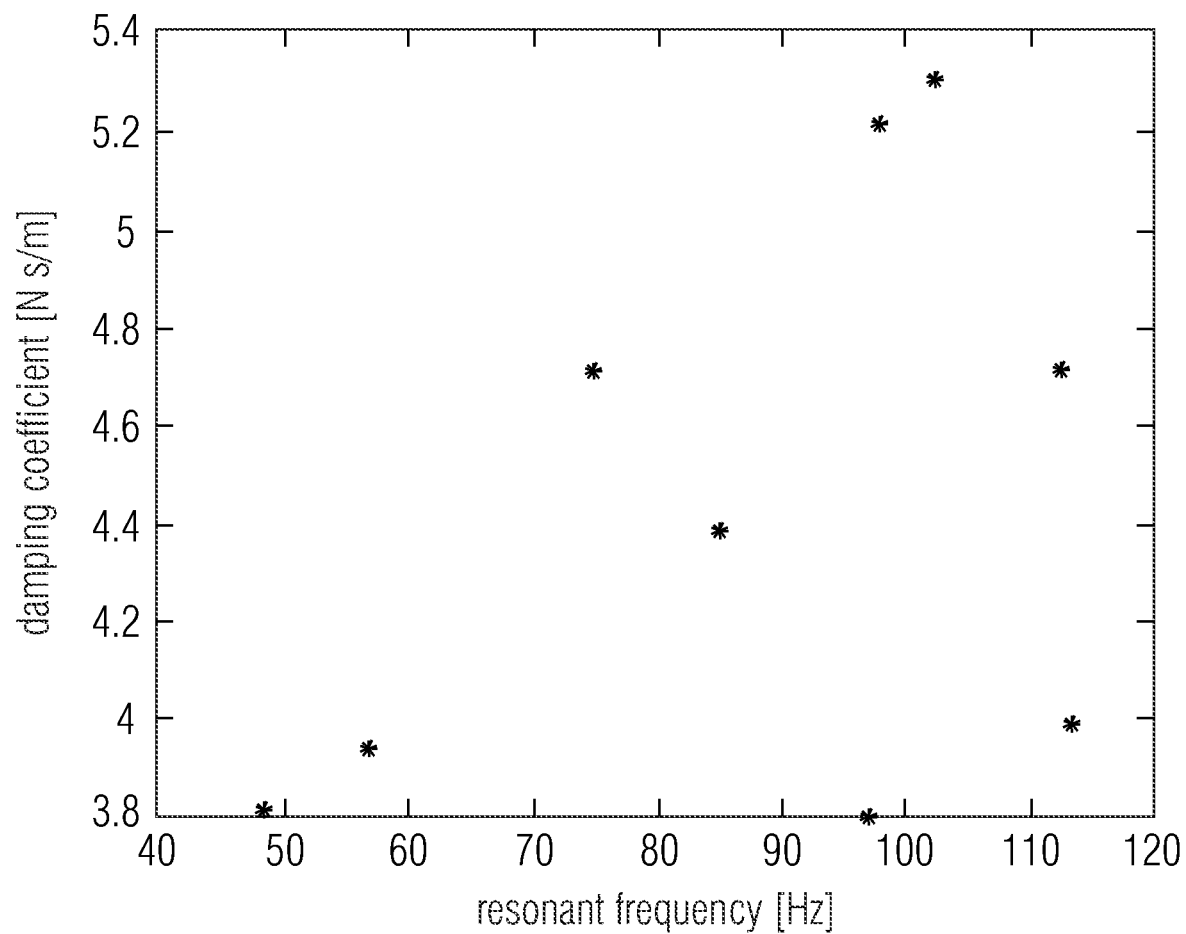
FIG. 5d shows an exemplified diagram illustrating the estimated resonant frequencies and damping coefficients (of the rectangular listening space of FIG. 5a)
Figure 5E:
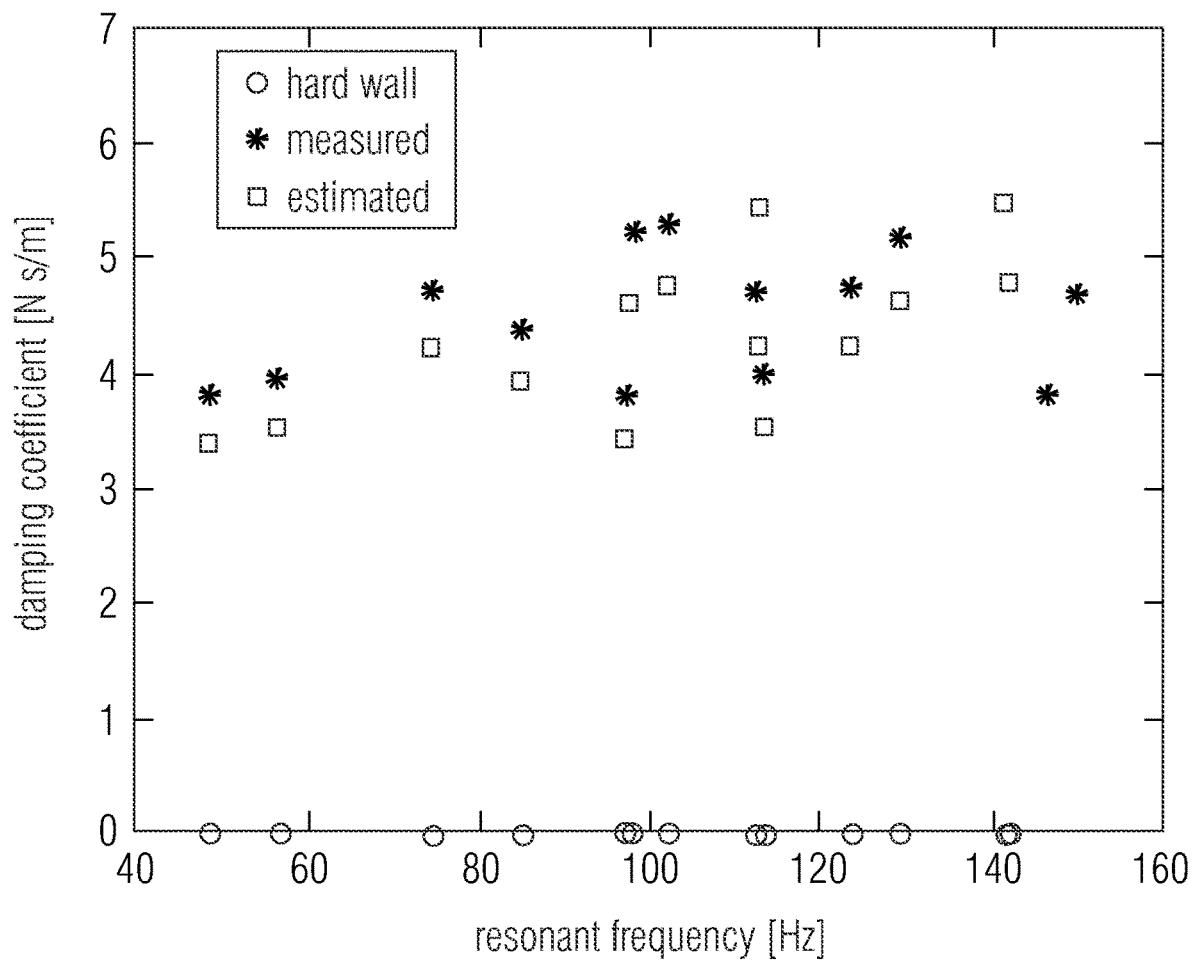
FIG. 5e illustrates an exemplified result of the surface wall impedance estimation process with a diagram.
Figure 5F:
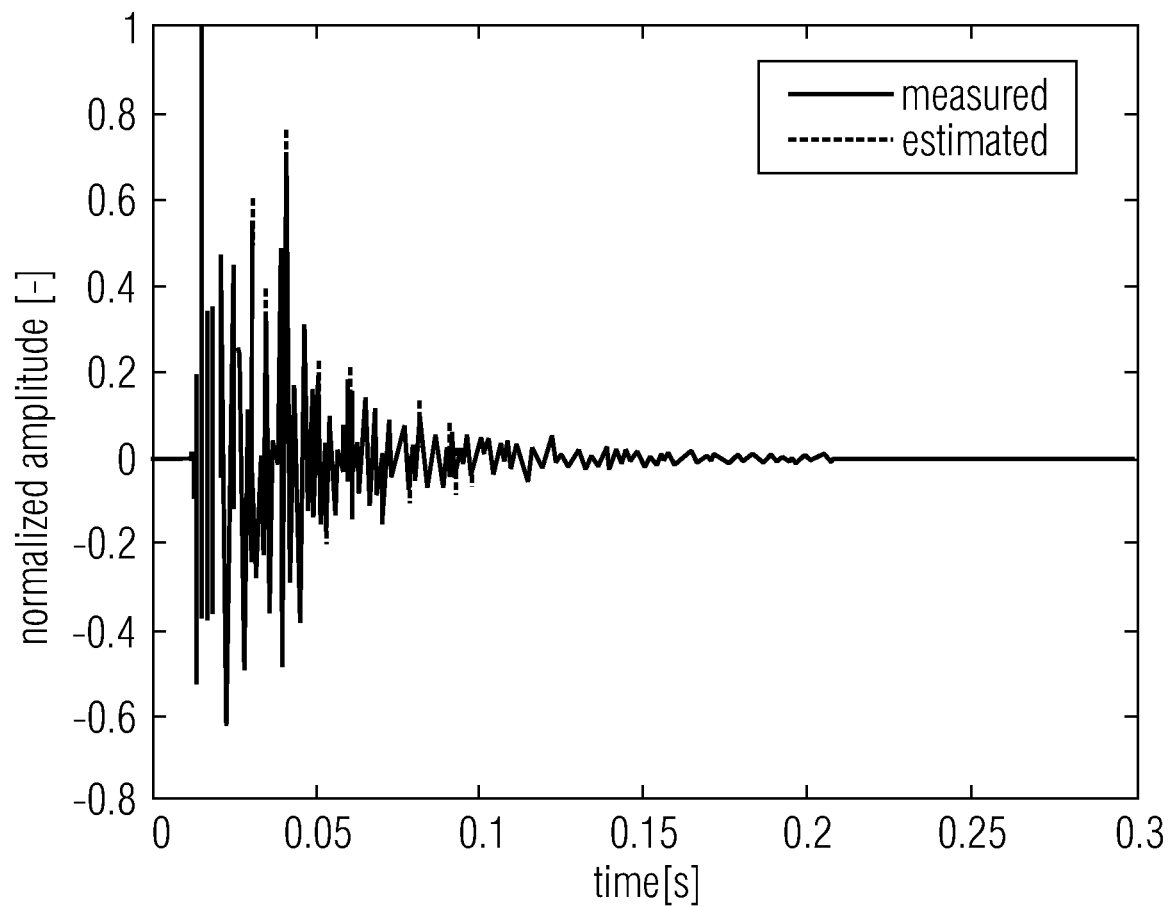
FIG. 5f shows an exemplified diagram of a comparison between a measured and an estimated impulse response at new positions (estimated data has been generated using the inferred geometry and estimated impedance of the space)

FIG. 5d illustrates the result of computing the resonant frequencies and their related damping coefficients from either the impulse response or the transfer function. This information could be obtained by analysis of the short time Fourier transform of the impulse response (as shown in the Alternative Acoustic Surface Impedance Estimation section below). For the example, Prony's method may have been used. The method computes resonant frequencies and damping coefficients of a system by fitting a function to the impulse response. The function has the form:

$$h(t) = \sum_{i=1}^{M} A_i e^{\sigma_i t} \cos(\omega_i t + \phi_i),$$

where M is the number of modes (each mode will have a resonant frequency), $A_i$ is the amplitude of modal component i, $\sigma_i$ is the damping coefficient, $\omega_i$ is the resonant frequency, and $\phi_i$ is the phase. In this way, the measured impulse response is decomposed into a set of quantifiable decaying exponential functions.

The next step uses the inference (or input) of the geometry of the acoustic space. In the example that follows, a rectangular geometry is used to demonstrate how a simple RGI approach could be used. Note, however, that the method does not require any restrictions to be placed on the shape of the acoustic space, and can make use of alternative geometry input mechanisms (e.g., user input, or Computer Aided Design (CAD) models).

When the space is a rectangular parallelepiped, and with knowledge of the resonant frequencies, it is possible to infer the geometry of the space using an analytic solution for the resonant frequencies:

$$\omega_i = \omega_{n_x, n_y, n_z} = c\pi \sqrt{\left(\frac{n_x}{L_x}\right)^2 + \left(\frac{n_y}{L_y}\right)^2 + \left(\frac{n_z}{L_z}\right)^2},$$

where c is the speed of sound, $n_j = 0, 1, 2, \ldots$ determine the order of the acoustic modes supported by the space, and $L_j$ are the unknown dimensions of the geometry. Since the resonant frequencies are known, an optimization problem can be solved to find the unknown dimensions. Using these dimensions, the geometry of the acoustic space can be inferred. For more complicated geometries, advanced room geometry inference methods can be used. Various methods exist, see for example the work contained in reference Tuna et al.

The next step is to find/estimate/infer the surface impedance. Various impedance measurement methods exist, for example the impedance tube method. Alternatively, the reverberation room method could be used to find absorption coefficients, which could then be used to compute estimates of the real part of the (generally complex) impedance. A table of absorption coefficients for common construction materials could also be used for estimation of real impedances.

Note that, while it is possible to find a surface impedance for each different surface in the space, is some cases acceptable transfer functions can be obtained based on averaged impedance estimates, e.g., it is possible to estimate a single (average) impedance for all surfaces, or pairwise impedance for walls facing each other. Ideally, of course, the individual impedance of all boundary surfaces would be given or estimated.

An advantageous impedance estimation embodiment, which has also been used to generate the results, is in-situ impedance estimation. To enable this, a model of the resonant frequency and damping coefficient is used to find the impedance(s). The model is given by:

$$\tilde{\omega}_i^{(1)} = \omega_i^{(0)} \frac{B_{ii}^{(0)}}{B_{ii}^{(1)}}$$

where $\tilde{\omega}_i^{(1)}$ is a complex quantity comprising the estimated resonant frequency and its associated damping coefficient, $\omega_i^{(0)}$ is a hard-walled resonant frequency, $B_{ii}^{(0)}$ is a function of the geometry of the space, and $B_{ii}^{(1)}$ depends on the geometry and surface impedance of the space. Using an optimization scheme, the impedance values that minimize the difference between the measured and estimated resonant frequencies and damping coefficients give the estimated impedance values. An example of the result of this process is given in FIG. 5e.

Figure 7A:
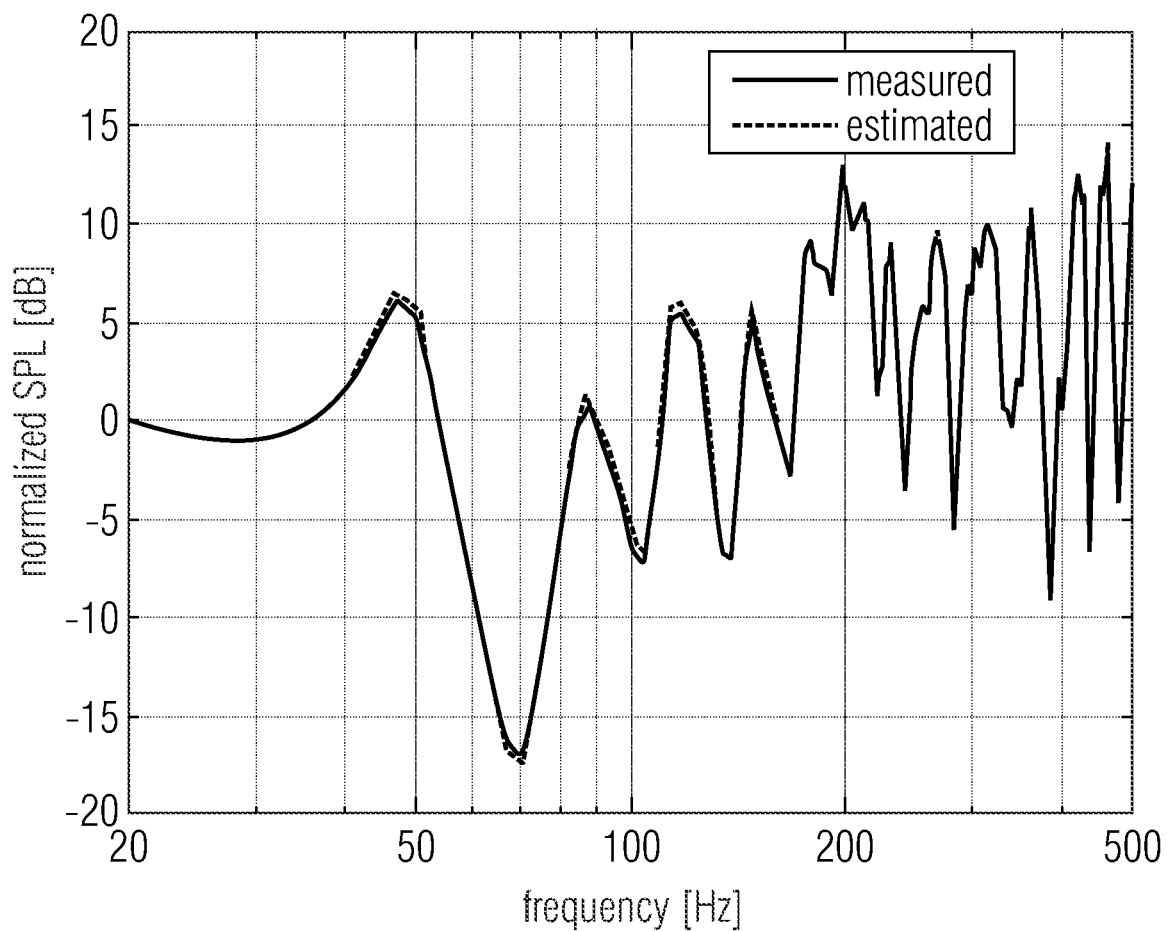
FIGS. 7a, 7b show schematic diagrams of a comparison between a measured and estimated transfer function at new target positions, as well as a diagram for demonstrating the application of the digital compensation at the new position.

Once the room geometry and surface impedance have been found, a computer model can be used to estimate the acoustic field in other positions within the acoustic space. Any wave-based model could be used, like for example the finite element method or the finite difference method. Use is made of the finite element method in this description of the method. A comparison of the measured and estimated impulse responses at a position different to that of the initial measurement position is given in FIG. 5f. Note due to the small difference between the measured and the estimated signal, the curves are difficult to differentiate (while the curves as shown by FIG. 7a, which are based on the same data, make the difference more clear).

According to embodiments, the acoustic surface impedance estimation can be based on eigenvalue approximation.

Governing equation—A sound field can be described by the wave equation $$\nabla^2 p - \frac{1}{c^2} \frac{\partial^2 p}{\partial t^2} = 0, \quad (1)$$

where p is the acoustic pressure, and c is the speed of sound. Assuming solutions of the form $p \sim e^{i\omega t}$, gives the Helmholtz equation:

$$\nabla^2 p - \frac{(i\omega)^2}{c^2} p = 0, \quad (2)$$

where $\omega$ is the angular frequency.

Finite element method—Multiply Eq. (2) by a test function, q, integrate over domain $\Omega$, make use of integration by parts, and use Green's theorem to obtain $$\int_\Omega \left[ \nabla q \cdot \nabla p + \frac{(i\omega)^2}{c^2} qp \right] d\Omega - \int_{\partial\Omega} \left[ q \left( \frac{\partial p}{\partial \hat{n}} \right) \right] d\Gamma = 0, \quad (3)$$

where $\partial\Omega$ is the bounding surface of the geometry, and $\hat{n}$ is the outwardly pointing unit normal vector. Using the conservation of momentum yields $$\int_\Omega \left[\nabla q \cdot \nabla p + \frac{(i\omega)^2}{c^2} qp\right] d\Omega - \int_{\partial\Omega}\left[\frac{(i\omega)}{c}\frac{\rho c}{Z} qp\right] d\Gamma = 0, \quad (4)$$

where $\rho$ is the medium density, and Z is a locally reacting normal impedance.

Let $\zeta = Z/\rho c$ be a normalized impedance.
Let $= \ell^T p$, where $\ell$ is an interpolating shape function, and p is a discretized pressure, to yield:

$$\left\{\int_\Omega\left[\nabla \ell \nabla \ell^T + \frac{(i\omega)^2}{c^2}\ell\ell^T\right]d\Omega + \int_{\partial\Omega}\left[\frac{(i\omega)}{c}\frac{1}{\zeta}\ell\ell^T\right]d\Gamma\right\}p = 0, \quad (5)$$

which can be written as $$[K + i\omega C + (i\omega)^2 M]p = 0, \quad (6)$$

where $$K = \int_\Omega (\nabla \ell \nabla \ell^T) d\Omega, \quad (7)$$

$$C = \frac{1}{c}\frac{1}{\zeta}\int_{\partial\Omega}(\ell\ell^T)d\Gamma, \quad (8)$$

$$m = \frac{1}{c^2}\int_\Omega (\ell\ell^T)d\Omega, \quad (9)$$

Eigenvalue problem—Let $\lambda = i\omega$, and rewrite Eq. (6) as a quadratic eigenvalue problem $$[K + \lambda C + \lambda^2 M]v = 0, \quad (10)$$

which can be written as the first order system $$\left(\begin{bmatrix} K & 0 \\ 0 & -M \end{bmatrix} + \lambda \begin{bmatrix} C & M \\ M & 0 \end{bmatrix}\right)\begin{Bmatrix} v \\ \lambda v \end{Bmatrix} = \begin{Bmatrix} 0 \\ 0 \end{Bmatrix}. \quad (11)$$

The generalized eigenvalue problem is written more succinctly as $$Av = \lambda Bv, \quad (12)$$

where, $$A = \begin{bmatrix} -K & 0 \\ 0 & M \end{bmatrix}, B = \begin{bmatrix} C & M \\ M & 0 \end{bmatrix}, \text{ and, } v = \begin{Bmatrix} v \\ \lambda v \end{Bmatrix}, \quad (13)$$

$\lambda$ is an eigenvalue and v contains the corresponding eigenvector.

Eigenvalue approximation—Consider two eigenvalue problems, one of which is solved (identified henceforth by superscript $^{(0)}$), while the other is yet to be solved (identified by superscript $^{(1)}$). The only difference between the two systems is a change in the impedance boundary condition. The eigenvalue problem with known solutions is:

$$Av_n^{(0)} - \lambda_n^{(0)} B^{(0)} v_n^{(0)} = 0. \quad (14)$$

The eigenvalue problem which is to be solved is:

$$Av_n^{(1)} - \lambda_n^{(1)} B^{(1)} v_n^{(1)} = 0. \quad (15)$$

Pre-multiplying Eq. (15) by the transpose of the $j^{th}$ known eigenvector $$(v_j^{(0)})^T (A - \lambda_n^{(1)} B^{(1)}) v_n^{(1)} = 0, \quad (16)$$

and rewrite the unknown vector as a product of a matrix of the known eigenvectors and a vector of unknown coefficients $$v_n^{(1)} = V^{(0)} e_n. \quad (17)$$

Systems (14) and (15) have identical geometries, and thus the functions that describe the modes can be taken from the same mathematical space, i.e. the eigenvectors of the systems are related. The unknown coefficients that relate the eigenvectors are complex and describe a change to the eigenvectors due to a change in boundary conditions. Substitute (17) in (16) to obtain $$(v_j^{(0)})^T (A - \lambda_n^{(1)} B^{(1)}) V^{(0)} e_n = 0. \quad (18)$$

Assuming that the $j^{th}$ component of the unknown coefficient vector is greater than the other components, $e_{n,i=j} \gg e_{n,i\neq j}$, and therefore that $e_{n,i\neq j} = 0$, and choosing n=j, $$(v_j^{(0)})^T (A - \tilde{\lambda}_j^{(1)} B^{(1)}) v_j^{(0)} = 0 \quad (19)$$

can be found.

Where $\tilde{\lambda}_j^{(1)}$ is an approximation of $\lambda_n^{(1)}$. Now, from (14), $$(v^{(0)})^T A v_j^{(0)} = \lambda_j^{(0)} (v_j^{(0)})^T B^{(0)} V_j^{(0)}. \quad (20)$$

Substitution of (20) into (19) yields $$\lambda_j^{(0)} (v_j^{(0)})^T B^{(0)} v_j^{(0)} - \tilde{\lambda}_j^{(1)} (v_j^{(1)})^T B^{(1)} v_j^{(1)} = 0. \quad (21)$$

This can be further simplified to give $$\tilde{\lambda}_j^{(1)} = \lambda_j^{(0)} \frac{B_{jj}^{(0)}}{B_{jj}^{(1)}}. \quad (22)$$

From the definition of $\lambda$, $$\tilde{\omega}_j^{(1)} = \omega_j^{(0)} \frac{B_{jj}^{(0)}}{B_{jj}^{(1)}} \quad (23)$$

is obtained.

This implies that, when only the boundary conditions change, a set of eigenvalues related to that change from a set of known eigenvalues and eigenvectors can be approximated. In practice, an initial eigenvalue problem would need to be solved. However, this problem could be the hard-walled boundary condition problem, which uses half of the memory needed to solve the damped problem. Furthermore, if available, analytic eigensolutions could be used, like for example a hard-walled rectangular shaped room.

This approach could be used when one is attempting to find the complex frequency dependent impedance of a surface; the known solution set and the set of relevant matrices could then be used to construct an optimization problem. This approach could significantly reduce the time needed to find solutions. Once a new solution set is found, it could be used to confirm that the approximate solutions satisfy the problem, or it could be used as a new initial value set for further optimization.

Below, an alternative acoustic surface impedance estimation will be discussed. The alternative example implementation of a specific variant of surface impedance estimation as described in the following focuses on a specific basic use case, namely rectangular rooms with six walls having pairwise uniform surface impedance for walls facing each other.

The implementation given in the following presents a computationally efficient surface impedance estimation method for the given basic use case. The approach is based on analyzing damping coefficients in room Impulse Responses (IRs). Damping coefficients quantify the rate at which room modes decay. They can be related to frequency specific reverberation times.

The impedance estimation method exemplified in the following analyzes damping coefficients in IRs from a set of source and receiver positions.

The method uses only knowledge of the room geometry, and a set of IRs.

If the room geometry is determined from the IRs, then a set of IRs is the only input. The method as presented in the following only calculates frequency-independent real impedances. However, for some application use cases this is sufficient. An adaptation to estimating frequency dependent impedances is possible by a frequency selective calculation.

First, IRs are measured between multiple source and receiver positions, with no specific constraints on these positions. Second, the geometry of the room producing the IRs is either blindly inferred or given to the impedance estimation method as an a priori input. Third, the damping coefficients of the resonance frequencies in the IRs are detected. Fourth, the damping coefficients are used in a least-squares optimization scheme to estimate three impedances for the walls along each dimension (x, y or z). For some applications, estimating three impedances is sufficient to get adequately accurate room transfer function inferences/estimates.

Derivation of alternative method: The damping coefficient $\delta_n$ is computed according to $$\delta_n = \left(\frac{c}{V}\right) \cdot \left(\sum_{d=1}^{3} \epsilon_{n,d} \frac{S_d}{\zeta_d}\right), \tag{24}$$

where c is the speed of sound, V is the room volume, $S_x=L_yL_z$, $S_y=L_xL_z$, $S_z=L_xL_y$ are the surface areas of the walls along the dimension d=1, 2 or 3 (denoting the x, y or z dimension respectively), and $\zeta_d$ denotes the normalized impedances of the two walls orthogonal to the d dimension's axis.

Given a room mode's 3-tuple label $n_{xyz}=(n_x, n_y, n_z)$ which can be computed from the room dimensions, $\epsilon_{n,d}$ is given by $$\epsilon_{n,d} = \begin{cases} 1 & \text{if } n_d = 0 \\ 2 & \text{if } n_d > 0 \end{cases}. \tag{25}$$

The modal frequency-specific reverberation time $T_{60,n}$ can be computed from the $\delta_n$ values using $$T_{60,n} = \frac{\ln(10^3)}{\delta_n}. \tag{26}$$

The impedance estimation method described here gives real impedance estimates. In the case of relatively hard and reflective walls, it is considered admissible to assume a real wall surface impedance.

A further simplification used in this method is that one real impedance per dimension in the room is estimated.

For selected resonance frequencies, which are pre-computed using the analytic model $$\omega_i = \omega_{n_x,n_y,n_z} = c\pi\sqrt{\left(\frac{n_x}{L_x}\right)^2 + \left(\frac{n_y}{L_y}\right)^2 + \left(\frac{n_z}{L_z}\right)^2},$$

the method first detects the damping coefficients using e.g. a method as described in (Karjalainen, 2001), which is designed for detecting damping coefficients $\widehat{\delta_n}$ or frequency-specific decay times $\widehat{T_{60,n}}$, interchangeably.

This is done for IRs for multiple source and receiver positions in the room.

The $\widehat{\delta_n}$ estimation starts by computing the time-dependent spectral envelopes (e.g. based on waterfall plots) from each IR using a Short-Time Fourier transform (STFT). In this way, the separation of the analysis by resonant frequency can be made straightforward by restricting it to individual frequency bins in the STFT.

In the following exemplifying implementation, the analysis is restricted to axial modes, excluding tangential and oblique modes.

For each retained frequency bin in the STFT, a normal room mode is modelled as a decaying exponential $A_n e^{-\delta_n t} \sin(\omega_n t + \varphi_n)$, where n denotes a specific mode, $A_n$ its amplitude, $\omega_n$ its angular frequency and $\varphi_n$ its phase delay. This model translates into linear time decay on the STFT in decibel scale, with the decay slope forming a straight-line. Such an exponential decay is a commonly used model for room resonances. The damping coefficient $\delta_n$ is detected by fitting this model to the observed decay slopes using least-squares optimization. In the following example implementation, a further constraint enforces that the fitted damping coefficients are positive, since only positive damping coefficients are valid for the problem being considered.

Given knowledge of the room dimensions, the impedance estimation detailed in this example implementation relies on comparing detected damping coefficients $\widehat{\delta_n}$ against theoretically-derived damping coefficients $\delta_n$ computed assuming specific impedance guesses using Equation (24). Thus, a system of equations is constructed for a set of IRs using the $\widehat{\delta_n}$ values detected for axial room modes. The optimization iteratively changes the initial impedance guess until the mismatch between theoretical and observed damping coefficients is minimized in the least-square sense, producing a joint estimate of the impedance 3-tuple $\{\widehat{\zeta_d}, d \in \{x,y,z\}\}$ by solving $$\underset{\{\xi_d, d \in \{x, y, z\}\}}{\mathrm{argmin}} \sum_n (\delta_n - \widehat{\delta_n})^2, \tag{27}$$

with $\xi_d > 0, \forall d$.

The estimation is started with an initial impedance guess of e.g. $\zeta_d=200$, $\forall d$, corresponding to a moderately hard wall.

Every mode and its detected $\widehat{\delta_n}$ constitute a data point and contribute an equation to the equation system. These modes are analyzed across multiple IRs corresponding to multiple positions, and the different equations resulting from all the $\widehat{\delta_n}$ detections are concatenated into a single equation system.

In the example detailed here, frequency-independent impedances are estimated, e.g., a single impedance value per dimension. Nonetheless, the method can be adapted for estimating frequency-dependent impedances by considering single resonances only, or only resonances within frequency sub-bands. In principle, the estimation can still function with the same accuracy in that case as long as more data points are available, i.e., more IRs from multiple positions are available.

Below, a first example application for equalization of an audio reproduction system will be discussed. The method of obtaining information about the sound field at non-observed positions can be used for different audio processing tasks.

In the following, its application for room equalization of an audio playback system is exemplified.

Usually such an optimization/equalization can only be achieved for positions where specific measurements have been carried out.

Using the method as described above, such an equalization can also be performed for positions where no measurement has been taken.

This can advantageously be applied to enhance, e.g. in audio reproduction scenarios, where, e.g., the listener position can be tracked, the listening experience. The described method can be used to take changes in listener position into account in order to improve listener experience. Furthermore, based on at least one measurement, the reproduction can be optimized for different static listening positions, which a user may select from. Furthermore, the signals played back by at least one loudspeaker can be modified such that they are more suitable for playback in a specific environment than the unmodified signals (e.g. the equalization can be optimized for a larger area by considering several estimates of the sound field at different positions, and optimizing for an average best solution).

Figure 6:
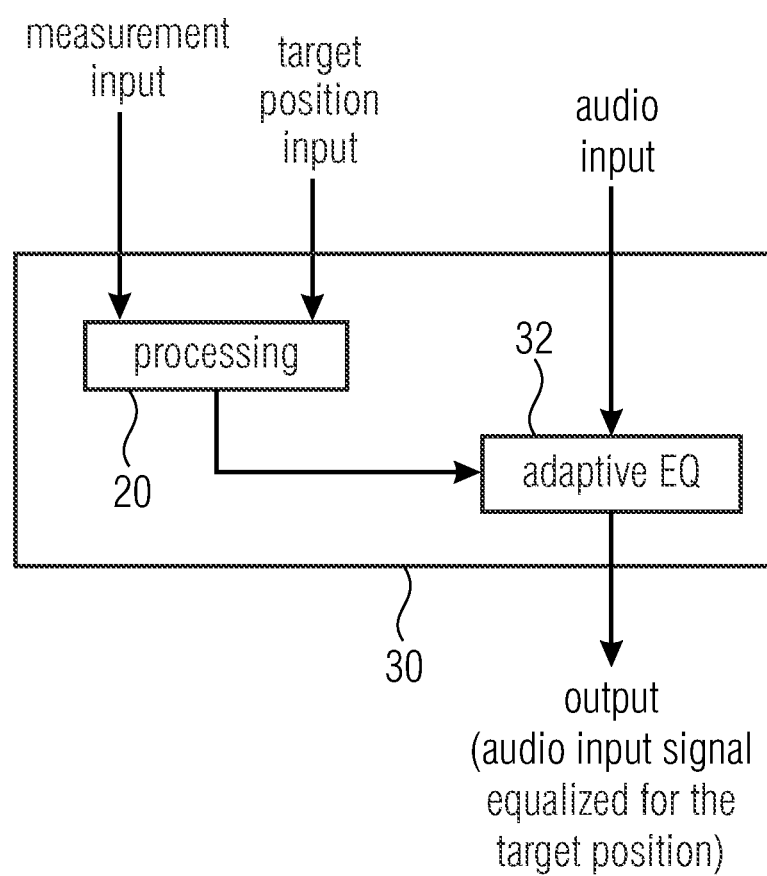
FIG. 6 shows a schematic system using the determined sound field for adapting an audio reproduction according to embodiments.

These general processing steps are outlined by FIG. 6.

FIG. 6 shows a processing unit 20 receiving the measurement input and the target position for determining the sound field in combination with an adaptive equalizer 32, together forming the system 30. The adaptive equalizer receives an audio input, which is processed based on the previously calculated sound field at the target position.

Below, the function of the processor 32 will be discussed.

A processor 32 for equalizing one or more audio signal(s) (e.g. a one-channel, multi-channel audio signal or object-based or scene-based audio signal) for a specific (non-observed) position receives one or more impulse response, an audio input that should be played back in the reproduction environment, and an information about the target position (e.g. listening position) for which the reproduction should be optimized. According to the method, the target position can be remote from the measurement position.

Usually, the equalization is based on one or more observed (e.g. measured) impulse responses.

According to the method, the impulse response at any position can be inferred. Such, the input to the adaptive EQ 32 that performs the audio signal equalization comes from the processing step of estimating the impulse response at any selected position within the listening environment.

This has the benefit that, based on at least one measurement, the signal emitted by a playback system can be adjusted to be best suited for a different (i.e. remote from the measurement position) listening position in the same environment.

To show the influence of such an equalization, figure (FIG. 7a) exemplifies a measured transfer function at a target position, and the estimated transfer function at the same target position that has been estimated based on a measurement at another position.

FIG. 7a such illustrates the agreement between the transfer functions of the measured and estimated transfer functions at a receiver position that is different to that of the initial measurement.

FIG. 7a compares measured and estimated transfer functions at a target position.

Figure 7B:
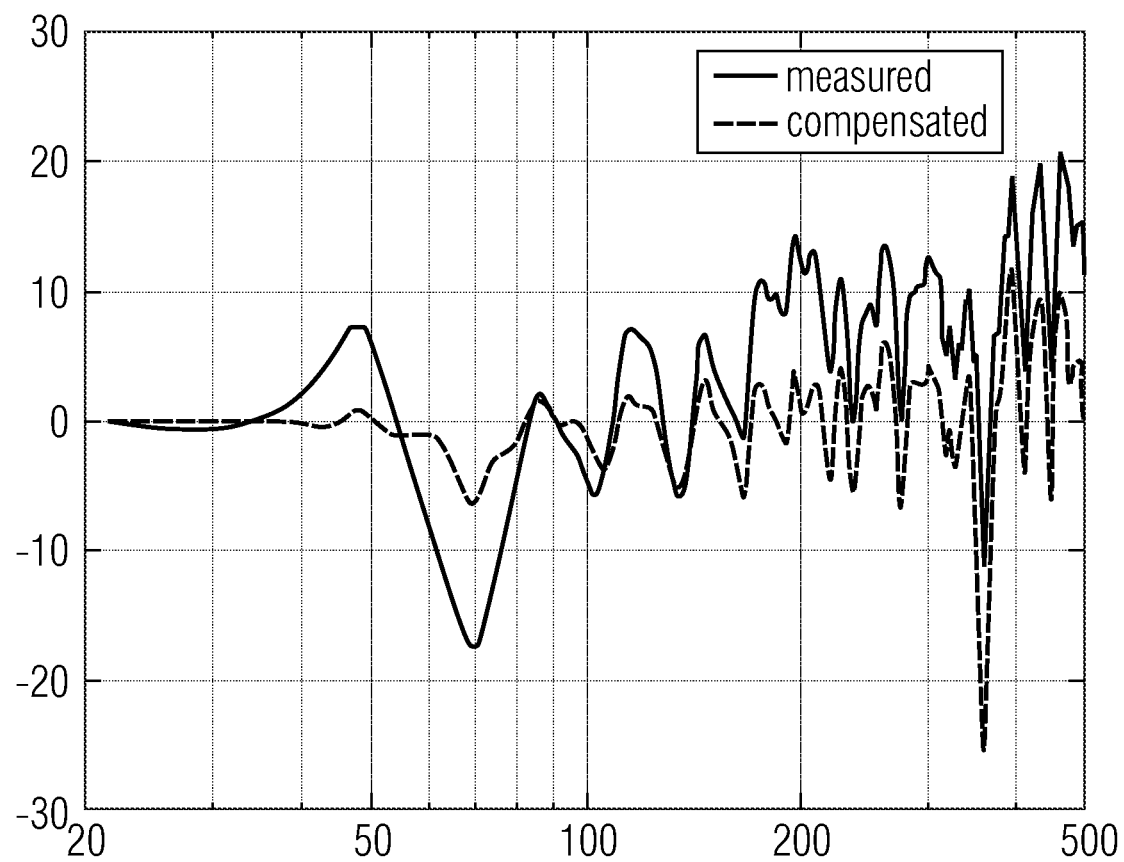

The results of a target position dependent equalization is exemplified in FIG. 7b. FIG. 7b demonstrates the application of digital compensation at the new position.

Once the transfer function is available, location specific adjustments can be made to the sound field by (digitally) manipulating the source signal. FIG. 7b demonstrates the result of compensating the acoustic response at a new position in the space, to achieve a more even (flat) frequency response, and thereby improving listener experience.

The specifics of the implementation of the filtering process (adaptive EQ) can vary. Different methods have been described in the literature. The method described here is independent of the specific room correction approach or equalization algorithm or filtering method that is used.

In other words, this means that the below-discussed applications, e.g., for listening environment or material property estimation, can make use of the above-discussed principles.

Below, a second example application for detecting changes to a listening environment will be discussed.

The method of obtaining information about geometrical and impedance properties of an acoustic environment can be used to determine if the properties of a listening environment have changed.

Changes to the environment can be detected by comparing the room properties (identified by analyzing a measured IR) of an acoustic environment at two different instants in time. Changes may occur due to, e.g., a moved source, the addition of large and/or acoustically hard objects to the environment, or the addition of objects that significantly alter the acoustic impedance properties of the environment, like, e.g., a change in the number of persons in the listening environment.

By comparing the room properties of two conditions, e.g. an empty room vs. a room containing an acoustically absorbing sample, it is possible to quantify the change of impedance. With knowledge of the impedance of the empty room, it is then possible to characterize the impedance of the sample. For example, it may be possible to estimate the effect on a sound field of moving, e.g., a sofa, other large items of furniture, or even curtains, in and out of a room. Note that the acoustic space need not be empty, the only requirement is that the initial state of the space is characterized.

Changes to a listening space can be identified, by monitoring the geometry and surface impedance of the space, and can be used to update a computer model of the acoustic space. The updated model is used to determine the changed sound field at any position in the space. This new information can be used to change the audio signal processing to further enhance a listening experience.

According to embodiments, a collection of measurement data can be done:

The impulse response measurement that is used to perform the method could be done, e.g., by an external microphone, a cellphone, directly on the sound emitting device, using, e.g., the microphones that are built in for smart assistants/voice control, or by the microphones of another device within the room (this could e.g. be another smart speaker that can interact with the sound emitting device).

According to embodiments, the resonant frequency can be estimated.

Another way of estimating resonance frequencies is to fit a pole-zero filter model (e.g. using Karjalainen 2002) to the impulse response(s); the poles in the model then determine the resonance frequencies.

According to embodiments, the geometry can be inferred/specified, e.g., using acoustical or optical methods. Alternatively, the user could specify the shape of the acoustic space and its dimensions. Professional users of the method may have access to detailed room plans, possibly in CAD format, or may even choose to specify a space that does not yet exist. Virtual spaces could also be defined for design or entertainment applications using VR and AR.

Regarding the impedance estimation/specification: according to embodiments, the impedance could be estimated acoustically, as described in the examples, or optically; an algorithm could identify the types of materials and surfaces present in the space, and could then refer to absorption coefficient tables to estimate the surface impedances.

Alternatively, a user of the method could specify the types of materials used, and their positions in the acoustic space. The user could specify either absorption coefficients or complex impedance data. Professional users may have access to measured complex impedances. Design or entertainment applications may allow for user-defined impedances.

According to embodiments, information of the reverberation time at each resonant frequency can also be found using the approaches described herein. This information could also be used in an audio processing stage to modify the reverberation time at specific frequencies.

Another embodiment refers to an alternative application for a measurement of material characteristics:

Based on the method as described above, material characteristics (e.g. the absorption coefficient or surface impedance) of material under test can be estimated.

One adaptation in the described process is such, that instead of measuring at a single point in the environment to estimate a different point in the environment: two measurements are done in the same environment, only that the material test sample is introduced into the environment. Then, the specifics of the model (based on measurements at the same position in both situations) are adapted to find the material characteristics of interest.

According to embodiments, identification of changes in a room (potentially even being able to find out what has changed) would be possible. Processing can continuously adapt to changes in listener position, thus enabling an improved, or enhanced, sound field that follows the listener. (Possible methods for tracking listener movement are e.g.: optical methods, ultrasound, WIFI).

According to further embodiments, the method can be used for training neural networks. With the described method, it is also possible to generate a large amount of realistic impulse responses that correspond to measurements in a real environment without the need of actually conducting a large number of measurements in that specific environment.

An embodiment provides a method that

Given an acoustic response (which may be an impulse response or a transfer function) at (at least) one position in a space Given geometric information about the space Can estimate the (surface) impedance (and therefore absorption coefficient(s)).

It should be noted that alternatively, the (surface) impedance could also be given, so that the measurement has the purpose to determine the geometry. These steps suffice for detecting changes in a room.

According to further embodiments, the above method uses a given location of the at least one sound source or determines this location. According to further embodiments, the acoustic impulse response throughout the space or a specific target positions within the space can be estimated.

Another embodiment provides a method using a given information about the impedance values of an acoustic space's bounding surface to estimate the sound field in positions in the space that have not been measured.

According to a further embodiment, the acoustic response is actually measured in the space(s) as opposed to e.g., given via a pre-recorded acoustic response.

According to a further embodiment, the geometry (geometric information) about the space and the source position is estimated/inferred.

Another embodiment uses the estimated acoustic response for digital compensation when applied to a signal that drives a sound emitting device. This has the purpose of making the sound field at any position behave in a desired manner.

According to a further embodiment, the estimated surface impedance(s) can be used for detecting changes in an environment.

Another embodiment uses the estimated surface impedance(s) to estimate the acoustical properties of the objects. Another embodiment provides an impedance estimation method using the above-discussed principle of acoustical estimation or optical estimation. Here, an algorithm could identify the types of materials and surfaces present in the space referring to absorption coefficients tables to estimate the surface impedance.

Another embodiment uses the above-discussed method to specify the types of materials and their positions in the acoustic space so as to specify either absorption coefficients or complex impedance data.

Another embodiment provides a signal, which is played by one smart speaker and recorded by another smart speaker.

Another embodiment provides a signal played and recorded by the same smart speaker or other devices having transducers as playback means (loudspeaker(s)) and recording means (microphone(s)).

Further applications for the above method are:

Auralization, VR, or AR, could be especially interesting in a professional setting. Imagine a company that designs acoustic spaces, and which wants to use VR to optimise a design, or guide a customer through a design. There is a strong incentive to generate efficient and accurate simulations: Then changes to the design could be evaluated in (close to) real time.

Professional listening applications, like for example recording, mixing and mastering music studios, could also benefit from this invention. The listening space, or studio, would be analyzed using the inventive method, and from this changes to the space could be suggested to the listener. Said changes could simply be the addition or removal of sound absorbing or reflecting material, and the corresponding locations for addition or removal. In a more advanced application of the method, the addition or removal of furniture, or even structural changes could be suggested. The optimum placement of loudspeakers could also be suggested.

This could also be applied to music rehearsal spaces, where an algorithm suggests changes to the listening space that will enhance the perception and enjoyment of the music.

Adaptations to the listening environment could also be used to improve office settings. Being aware of the global sound field could allow for a global equalization, which would aim to improve the acoustic experience for all meeting attendees.

Although some aspects have been described in the context of an apparatus, it is clear that these aspects also represent a description of the corresponding method, where a block or device corresponds to a method step or a feature of a method step.

Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] M. Karjalainen, P. Antsalo, A. Mäkivirta, T. Peltonen, and V. Välimäki, "Estimation of modal decay parameters from noisy response measurements," in J. Audio Eng. Soc., Vol. 50, No. 11, pp. 867-878, 2002.

[2] C. Tuna et al., "3D Room Geometry Inference Using a Linear Loudspeaker Array and a Single Microphone," in IEEE/ACM Transactions on Audio, Speech, and Language Processing, vol. 28, pp. 1729-1744, 2020.

[3] M. Karjalainen, P A. A. Esquef, P. Antsalo, A. Mäkivirta, and V. Välimäki, "Frequency-Zooming ARMA Modeling of Resonant and Reverberant Systems," in J. Audio Eng. Soc., vol. 50, no. 12, pp. 1012-1029, 2002.

The invention claimed is:

1. A method for determining and/or monitoring a sound field in an enclosed space or at a target position within the enclosed space, the method comprising:
   acquiring data representing at least one acoustic measurement at a single one measurement position within the enclosed space comprising an unknown acoustic environment and/or an unknown single one measurement position to acquire an interim value set;
   acquiring a room geometry of the enclosed space as second parameter describing the enclosed space; wherein acquiring the room geometry either comprises receiving the room geometry from an input or estimating the room geometry based on interim values of the interim value set;
   acquiring a surface impedance as first parameter describing the enclosed space, wherein acquiring the surface impedance comprises estimating the surface impedance based on the interim values of the interim value set;

determining a model of the enclosed space based on the first parameter and the second parameter; and estimating a sound field throughout the enclosed space based on the model of the enclosed space, the sound field describing a sound characteristic for one or more positions within the enclosed space;

wherein acquiring the surface impedance comprises an acoustic surface impedance estimation based on eigenvalue approximation.

2. The method according to claim 1, wherein estimating a sound field comprises an estimation of a change of the sound field.

3. The method according to claim 2, wherein the estimation of the change of the sound field comprises a impedance estimation for performing material classification of materials and surfaces present in the enclosed space.

4. The method according to claim 2, wherein the estimation of the change of the sound field is based on a change of parameters derived from an actual interim value set with respect to a previous determined interim value set.

5. The method according to claim 1, wherein the second parameter additionally comprises source information determined by use of an impulse response or an impulse response measured by use of the acoustic measurement; and wherein the source information comprising an information on a sound source position.

6. The method according to claim 1, wherein the sound field describes the sound characteristic of each position within the enclosed space.

7. The method according to claim 1, wherein acquiring the surface impedance is performed taking into account a known or estimated room geometry or the second parameter describing the enclosed space.

8. The method according to claim 1, wherein the method further comprises acquiring a sound source position as part of the second parameter describing the enclosed space based on the interim values set; or wherein the method further comprises acquiring a sound source position as part of the second parameter describing the enclosed space based on the interim values set wherein the acquiring is performed during the acquiring of the room geometry based on the interim value set or based on a received input.

9. The method according to claim 1, wherein the method further comprises performing another acoustic measurement to acquire another interim value set and updating the estimated sound field based on an updated model, wherein the model is updated based on at least an updated first parameter.

10. The method according to claim 1, wherein acquiring data representing the acoustic measurement is performed so as to determine an impulse response within the enclosed space; and/or wherein acquiring data representing the acoustic measurement is performed by performing the acoustic measurement in the enclosed space or by simulating the acoustic measurement.

11. The method according to claim 10, wherein acquiring the interim value set comprises a determination of one or more resonant frequencies and one or more damping coefficients, wherein determining the one or more resonant frequencies and one or more damping frequencies comprises fitting a function to the impulse response, wherein the function comprises the form of $h(t)=\sum_{i=1}^{M} [A_i e^{(\sigma_i t)}] \cos(\omega_i t + \phi_i)$, where M is the number of modes, $A_i$ is the amplitude of modular component, $\sigma_i$ is the damping coefficient, $\omega_i$ is the resonant frequency, and $\phi_i$ is the phase.

12. The method according to claim 11, wherein estimating the surface impedance comprises an in-situ impedance estimation based on one or more resonant frequencies and one or more damping coefficients.

13. The method according to claim 12, wherein the in-situ impedance estimation is based on the following formula $$\tilde{\omega}\_i\hat{}((1))=\omega\_i\hat{}((0))(B\_ii\hat{}((0)))/(B\_ii\hat{}((1)))$$

wherein $\tilde{\omega}\_i\hat{}((1))$ is a complex quantity comprising the estimated resonant frequency and its associated damping coefficient, $\omega\_i\hat{}((0))$ is a hard-walled resonant frequency, $B\_ii\hat{}((0))$ is a function of the geometry of the space, and $B\_ii\hat{}((1))$ depends on the geometry and surface impedance of the space.

14. The method according to claim 1, wherein the eigenvalue approximation is based on $\tilde{\omega}w\_j\hat{}((1))=\omega\_j\hat{}(0)) (B\_jj\hat{}((0)))/(B\_jj\hat{}((1)))$, where $\tilde{\omega}\_j\hat{}((1))$ is a complex quantity comprising estimated resonant frequency and its associated damping coefficient, $\omega\_j\hat{}((0))$ is a hard wall resonant frequency, $B\_jj\hat{}((0))$ is a resonant function of a geometry of the space and $B\_jj\hat{}((1))$ depends on the geometry and surface impedance of the space.

15. The method according to claim 1, wherein the estimation of the surface impedance comprises an analysis of damping coefficients.

16. The method according to claim 1, wherein acquiring the room geometry comprises estimating a room geometry; or determining the room geometry based on the calculation using an analytic solution for resonant frequency $\omega\_i=\omega\_(n\_x,n\_y,n\_z)=c\pi\sqrt{((n\_x/L\_x)^2+(n\_y/L\_y)^2+(n\_z/L\_z)^2)}$, where c is the speed of sound, $n\_j=0, 1, 2, \ldots$ determine the order of the acoustic modes supported by the space, and where $L\_j$ are the unknown dimensions of the geometry.

17. The method according to claim 1, wherein determining the model is based on a finite element method or a finite difference method or based on another method capable of modelling wave phenomena.

18. The method according to claim 1, wherein the method further comprises outputting an acoustic test signal for the acoustic measurement.

19. The method according to claim 1, wherein the method further comprises determining an audio adaption parameter based on the determined sound field, wherein the audio adaption parameter enables by use of same an adaption of an acoustic reproduction to the target position within the enclosed space or to the enclosed space; or determining a set of filter parameters based on the determined sound field, wherein the filter parameters enable by use of same an adaption of an acoustic reproduction to the target position within the enclosed space or to the enclosed space by use of the filter parameter set.

20. The method according to claim 1, wherein the method is performed by a system comprising a smart speaker for performing the acoustic measurement by use of a transducer as a playback element and a transducer as a recorder and a server or processor for performing at least one of the other steps; or wherein the method is performed by a system comprising a smart speaker for performing the acoustic measurement by use of transducer as a playback element and transducer as a recorder and a server or processor for performing at least one of the other steps by use of artificial intelligence.

21. The method according to claim 1, wherein acquiring data representing the acoustic measurement, acquiring the room geometry, acquiring the surface impedance, determining the model, and estimating the sound field are repeated for one enclosed space or more different enclosed spaces so as to build a data base comprising at least two data sets describing the sound fields.

22. A non-transitory digital storage medium having stored thereon a computer program for performing a method for determining and/or monitoring a sound field in an enclosed space or at a target position within the enclosed space, the method comprising:
acquiring data representing at least one acoustic measurement at a single one measurement position within the enclosed space comprising an unknown acoustic environment and/or an unknown single one measurement position to acquire an interim value set;
acquiring a room geometry of the enclosed space as second parameter describing the enclosed space; wherein acquiring the room geometry either comprises receiving the room geometry from an input or estimating the room geometry based on interim values of the interim value set;
acquiring a surface impedance as first parameter describing the enclosed space, wherein acquiring the surface impedance comprises estimating the surface impedance based on the interim values of the interim value set;
determining a model of the enclosed space based on the first parameter and the second parameter; and
estimating a sound field throughout the enclosed space based on the model of the enclosed space, the sound field describing a sound characteristic for one or more positions within the enclosed space,
wherein acquiring the surface impedance comprises an acoustic surface impedance estimation based on eigenvalue approximation;
when the computer program is run by a computer.

23. A determiner for monitoring a sound field in an enclosed space or at a target position within the enclosed space, the determiner comprises:
an interface for receiving data representing at least two acoustic measurement from a single one measurement position within the enclosed space comprising an unknown acoustic environment and/or an unknown single one measurement position to acquire an interim value set;
a processor configured to acquire a room geometry of the enclosed space as second parameter describing the enclosed space, wherein acquiring the room geometry either comprises receiving the room geometry from an input or estimating the room geometry based on interim values of the interim value set, and a surface impedance as first parameter describing the enclosed space, wherein acquiring the surface impedance comprises estimating the surface impedance based on the interim values of the interim value set; and to determine a model of the enclosed space based on the first and the second parameter;
wherein the processor is further configured to estimate a sound field throughout the enclosed space based on the model of the enclosed space, the sound field describing a sound characteristic for one or more positions within the enclosed space;
wherein acquiring the surface impedance comprises an acoustic surface impedance estimation based on eigenvalue approximation.

24. A system comprising a determiner according to claim 23 and at least one device comprising a playback element and/or a recorder for performing the acoustic measurement; or
a determiner according to claim 23 and a device comprising a playback element and/or a recorder for performing the acoustic measurement, wherein the determiner is implemented on processor; or
a determiner according to claim 23 and an adaptive equalizer configured to determine an audio adaption parameter based on the determined sound field, and to adapt an audio signal based on the audio adaption parameter so as to adapt an acoustic reproduction to a target position.

25. A method for determining and/or monitoring a sound field in an enclosed space or at a target position within the enclosed space, the method comprising:
acquiring data representing at least one acoustic measurement at at least one measurement position within the enclosed space comprising an unknown acoustic environment and/or an unknown single one measurement position or at a single one measurement position within the enclosed space comprising an unknown acoustic environment and/or an unknown single one measurement position to acquire an interim value set;
acquiring a room geometry of the enclosed space as second parameter describing the enclosed space; wherein acquiring the room geometry either comprises receiving the room geometry from an input or estimating the room geometry based on interim values of the interim value set;
acquiring a surface impedance as first parameter describing the enclosed space, wherein acquiring the surface impedance comprises estimating the surface impedance based on the interim values of the interim value set;
determining a model of the enclosed space based on the first and the second parameter; and
estimating a sound field throughout the enclosed space based on the model of the enclosed space, the sound field describing a sound characteristic for one or more positions within the enclosed space;
wherein acquiring the interim value set comprises a determination of one or more resonant frequencies and one or more damping coefficients, wherein determining the one or more resonant frequencies and one or more damping frequencies comprises fitting a function to an impulse response, wherein the function comprises the form of $h(t) = \sum_{i=1}^{M} [A\_i\, e^{(\sigma\_i\, t)}] \cos(\omega\_i\, t + \phi\_i)$, where M is the number of modes, A_i is the amplitude of modular component, σ_i is the damping coefficient, ω_i is the resonant frequency, and ϕ_i is the phase; or wherein acquiring the surface impedance comprises an acoustic surface impedance estimation based on eigenvalue approximation.

26. A determiner for determining and/or monitoring a sound field in an enclosed space or at a target position within the enclosed space, the determiner comprises:
an interface for receiving data representing at least one acoustic measurement from at least one measurement position within the enclosed space comprising an unknown acoustic environment and/or an unknown single one measurement position or from a single one measurement position within the enclosed space comprising an unknown acoustic environment and/or an unknown single one measurement position to acquire an interim value set;

a processor configured to acquire a room geometry of the enclosed space as second parameter describing the enclosed space, wherein acquiring the room geometry either comprise receiving the room geometry from an input or estimating the room geometry based on interim values of the interim value set, and a surface impedance as first parameter describing the enclosed space, wherein acquiring the surface impedance comprises estimating the surface impedance based on the interim values of the interim value set; and to determine a model of the enclosed space based on the first and the second parameter;

wherein the processor is further configured to estimate a sound field throughout the enclosed space based on the model of the enclosed space, the sound field describing a sound characteristic for one or more positions within the enclosed space;

wherein acquiring the interim value set comprises a determination of one or more resonant frequencies and one or more damping coefficients, wherein determining the one or more resonant frequencies and one or more damping frequencies comprises fitting a function to an impulse response, wherein the function comprises the form of $h(t)=\Sigma_{(i=1)}^{M} [\![ A\_i \, e^{(\sigma\_i \, t)} ]\!] \cos(\omega\_i \, t+\phi\_i)$, where M is the number of modes, $A\_i$ is the amplitude of modular component, $\sigma\_i$ is the damping coefficient, $\omega\_i$ is the resonant frequency, and $\phi\_i$ is the phase; or wherein acquiring the surface impedance comprises an acoustic surface impedance estimation based on eigenvalue approximation.

27. A method for determining and/or monitoring a sound field in an enclosed space or at a target position within the enclosed space, the method comprising:

acquiring data representing at least one acoustic measurement at at least one measurement position within the enclosed space comprising an unknown acoustic environment and/or an unknown single one measurement position or at a single one measurement position within the enclosed space comprising an unknown acoustic environment and/or an unknown single one measurement position to acquire an interim value set;

acquiring a room geometry of the enclosed space as second parameter describing the enclosed space;

wherein acquiring the room geometry comprises estimating the room geometry based on interim values of the interim value set;

acquiring a surface impedance as first parameter describing the enclosed space, wherein acquiring the surface impedance comprises estimating the surface impedance based on the interim values of the interim value set;

determining a model of the enclosed space based on the first and the second parameter; and estimating a sound field throughout the enclosed space based on the model of the enclosed space, the sound field describing a sound characteristic for one or more positions within the enclosed space;

wherein acquiring the surface impedance comprises an acoustic surface impedance estimation based on eigenvalue approximation.

28. A determiner for determining and/or monitoring a sound field in an enclosed space or at a target position within the enclosed space, the determiner comprises:

an interface for receiving data representing at least one acoustic measurement from at least one measurement position within the enclosed space comprising an unknown acoustic environment and/or an unknown single one measurement position or from a single one measurement position within the enclosed space comprising an unknown acoustic environment and/or an unknown single one measurement position to acquire an interim value set;

a processor configured to acquire a room geometry of the enclosed space as second parameter describing the enclosed space, wherein acquiring the room geometry comprises estimating the room geometry based on interim values of the interim value set, and a surface impedance as first parameter describing the enclosed space, wherein acquiring the surface impedance comprises estimating the surface impedance based on the interim values of the interim value set; and to determine a model of the enclosed space based on the first and the second parameter;

wherein the processor is further configured to estimate a sound field throughout the enclosed space based on the model of the enclosed space, the sound field describing a sound characteristic for one or more positions within the enclosed space;

wherein acquiring the surface impedance comprises an acoustic surface impedance estimation based on eigenvalue approximation.

* * * * *